US008365265B2

(12) United States Patent
Ueno

(10) Patent No.: US 8,365,265 B2
(45) Date of Patent: Jan. 29, 2013

(54) IMAGE FORMING APPARATUS, METHOD OF CONTROLLING THE APPARATUS, AND CONTROL PROGRAM STORED MEDIUM

(75) Inventor: Kazuhiro Ueno, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 12/785,359

(22) Filed: May 21, 2010

(65) Prior Publication Data

US 2010/0299737 A1  Nov. 25, 2010

(30) Foreign Application Priority Data

May 25, 2009  (JP) ................................. 2009-125773

(51) Int. Cl.
*H04L 29/06* (2006.01)
(52) U.S. Cl. ............................... 726/7; 380/55; 380/243
(58) Field of Classification Search ....................... 726/7
See application file for complete search history.

(56) References Cited

U.S. PATENT DOCUMENTS

2002/0026397 A1* 2/2002 Ieta et al. ..................... 705/35
2008/0231887 A1* 9/2008 Sakagami et al. ........... 358/1.15

FOREIGN PATENT DOCUMENTS

JP  2008-181491  8/2008

* cited by examiner

*Primary Examiner* — Jeffrey Pwu
*Assistant Examiner* — Thong Truong
(74) *Attorney, Agent, or Firm* — Carter, DeLuca, Farrell & Schmidt LLP

(57) ABSTRACT

An image forming apparatus communicates with an authenticating server having a storing unit which stores user information and first authentication information included in storage media in correspondence to each other. The image forming apparatus receives, from the authenticating server, the first authentication information which was made to correspond to user information input to the image forming apparatus, specifies the first authentication information which does not coincide with second authentication information obtained by reading a storage medium owned by the user and used for user authentication, and transmits a deleting request including the specified first authentication information to the authenticating server. The authenticating server transmits the first authentication information corresponding to the transmitted user information to the image forming apparatus, receives the deleting request including the first authentication information from the image forming apparatus, and deletes, from the storing unit, the first authentication information included in the received deleting request.

7 Claims, 20 Drawing Sheets

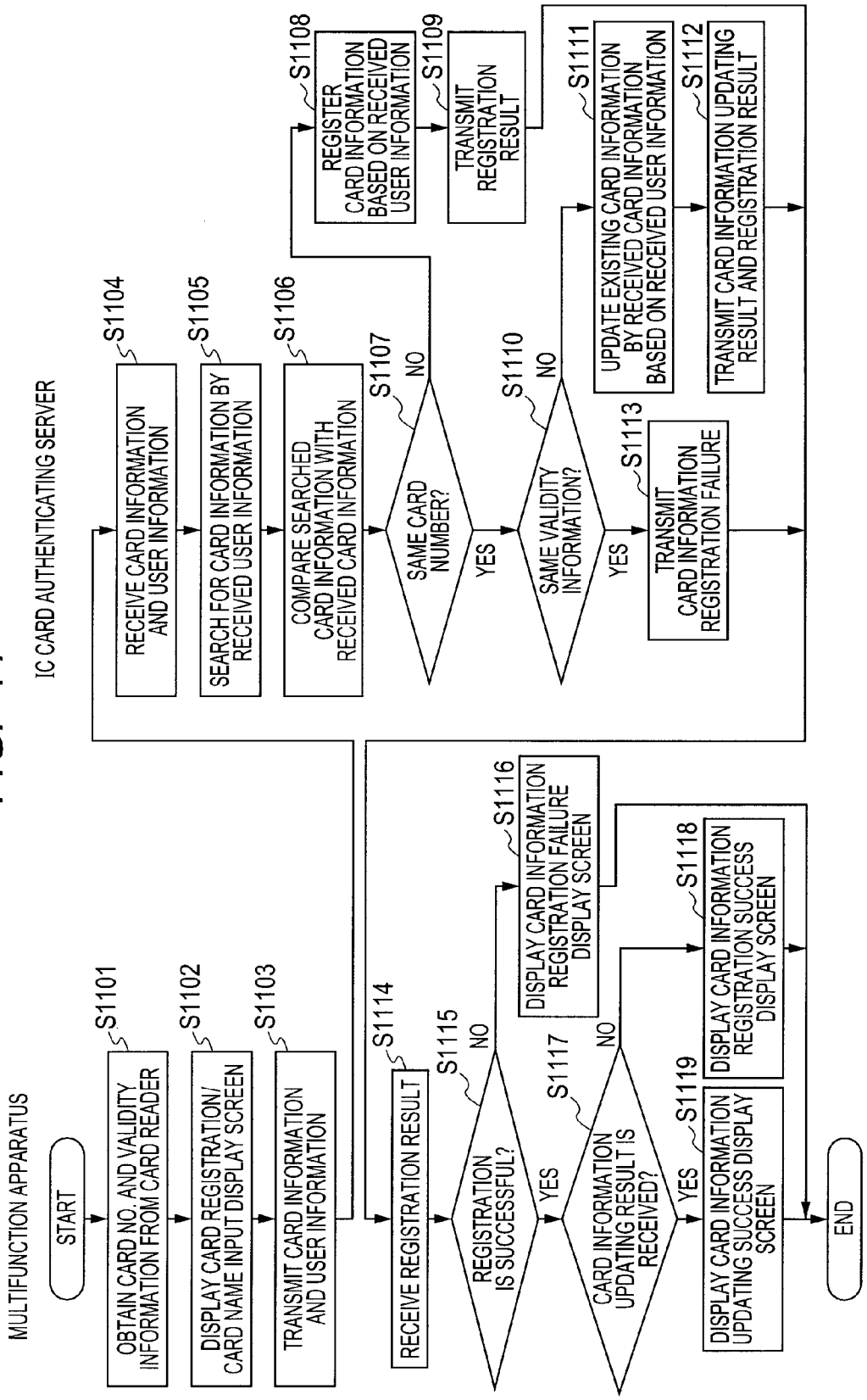

FIG. 12

CARD INFORMATION READING DISPLAY SCREEN 1200

REGISTRATION OF CARD INFORMATION

CARD INFORMATION IS REGISTERED INTO AUTHENTICATING SERVICE.
TOUCH CARD READER WITH CARD TO BE REGISTERED.

◀ RETURN        OK ▶

CARD REGISTRATION/
CARD NAME INPUT DISPLAY SCREEN 1300

REGISTRATION OF CARD INFORMATION

CARD INFORMATION IS REGISTERED INTO AUTHENTICATING SERVICE.
IF YOU APPROVE, PRESS "OK" BUTTON.

CARD INFORMATION:   2008055D275A        1301

CARD NAME: [                    ]

◀ RETURN        OK ▶

1303                                1305

IMAGE FORMING APPARATUS, METHOD OF CONTROLLING THE APPARATUS, AND CONTROL PROGRAM STORED MEDIUM

BACKGROUND OF THE INVENTION

1. Field of the Invention

The present invention relates to an image processing system, a print system, or the like which needs authentication.

2. Description of the Related Art

In recent years, there has already existed a system in which even when a multifunction apparatus is used, for the purpose of limiting the user, for example, by holding an IC card over a card reader of the multifunction apparatus, an inquiry is made to an authentication information managing apparatus (IC card authenticating server) about authentication information read out of the IC card, and if the authentication information has been registered, a reply of an authentication success is made to the multifunction apparatus, thereby enabling the multifunction apparatus to be used.

According to such a system, since card information (authentication information which permits use of the multifunction apparatus) of the IC card has to be preliminarily registered into the authentication information managing apparatus, there is such a problem that a troublesomeness of the administrator is required.

Therefore, such a system that when the IC card is authenticated, if the card information is not registered, the user who uses the IC card registers the IC card in the multifunction apparatus has been disclosed in the Official Gazette of Japanese Patent Application Laid-Open No. 2008-181491.

SUMMARY OF THE INVENTION

According to the invention, there is provided an authentication information management system in which an authenticating server having a storing unit in which user information for identifying the user and first authentication information included in a plurality of storage media have been stored in correspondence to each other and an image forming apparatus can communicate through a communication medium. The image forming apparatus comprises: an authentication information receiving unit configured to receive, from the authenticating server, first authentication information which was made to correspond to user information input to the image forming apparatus; an authentication information specifying unit configured to specify the first authentication information which does not coincide with second authentication information which is obtained by reading the storage medium that is owned by the user and is used for user authentication and which is included in the storage medium; and a deleting request transmitting unit configured to transmit a deleting request including the first authentication information specified by the authentication information specifying unit to the authenticating server. The authenticating server comprises: an authentication information transmitting unit configured to transmit the first authentication information which was made to correspond to the user information transmitted from the image forming apparatus to the image forming apparatus; a deleting request receiving unit configured to receive the deleting request including the first authentication information from the image forming apparatus; and a deleting unit configured to delete, from the storing unit, the first authentication information included in the deleting request received by the deleting request receiving unit.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 11 is a flowchart illustrating an example of a control procedure at the time of registration of card information in the authentication information management system 1 of the invention.

FIG. 12 is a diagram illustrating a card information reading display screen 1200 at the time of the registration of the card information in the authentication information management system 1 of the invention.

FIG. 13 is a diagram illustrating a card registration/card name input display screen 1300 in the authentication information management system 1 of the invention.

DESCRIPTION OF THE EMBODIMENTS

According to the invention, by reading a storage medium owned by the user, a deletion of a plurality of storage media registered for one user can be easily performed from an image forming apparatus.

A stocktaking of a plurality of storage media registered for one user can be also easily performed from the image forming apparatus.

An embodiment of the invention will be described in detail hereinbelow with reference to the drawings.

Figure 1:
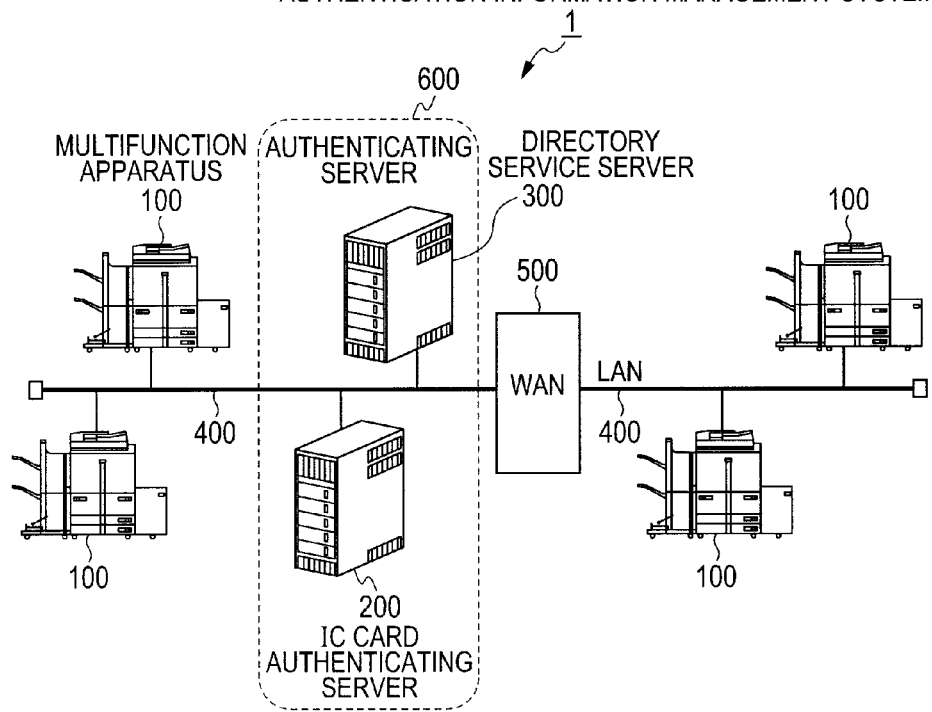
FIG. 1 is a system constructional diagram illustrating an example of a construction of an authentication information management system 1 of the invention.

FIG. 1 is a system constructional diagram illustrating an example of a construction of an authentication information management system 1 of the invention.

The authentication information management system 1 of the embodiment has such a construction that one or a plurality of multifunction apparatuses 100, one or a plurality of IC card authenticating servers 200, and one or a plurality of directory service servers 300 are connected through a LAN (Local Area Network) 400 and a WAN (Wide Area Network) 500, respectively.

Although a description will be made hereinafter, the IC card authenticating server 200 and the directory service servers 300 can be collectively regarded as an authenticating server 600.

The multifunction apparatus 100 (image forming apparatus) has various kinds of functions such as printing and the like. The multifunction apparatus 100 transmits user information and card information (authentication information) of an IC card to the IC card authenticating server 200 and performs an authenticating request and the like. In the embodiment, the card information of the IC card is key information which permits use of the multifunction apparatus 100. Although the embodiment will be described by using the IC card, the invention is not limited to the IC card but any storage medium can be used so long as it is a storage medium which is owned by the user and which can be used for the user authentication.

The IC card authenticating server 200 stores a table for authenticating the IC card (illustrated in FIG. 10, which will be described hereinafter) and executes an authenticating process by using the IC card authenticating table in response to an authenticating request by the IC card from the multifunction apparatus 100 or an authenticating request by a user name and a password.

The directory service server 300 unitarily stores and manages hardware resources such as servers, clients, and the like existing on a network and information such as attributes (for example, a login user name of Windows (registered trademark) of Microsoft Corporation, a password), access rights, and the like of the users who use them. For example, the directory service server 300 is a server having an Active Directory (registered trademark) function or an LDAP (Lightweight Directory Access Protocol) server.

A hardware construction of an information processing apparatus which can be applied to the IC card authenticating server 200 and the directory service server 300 illustrated in FIG. 1 will be described hereinbelow with reference to FIG. 2.

Figure 2:
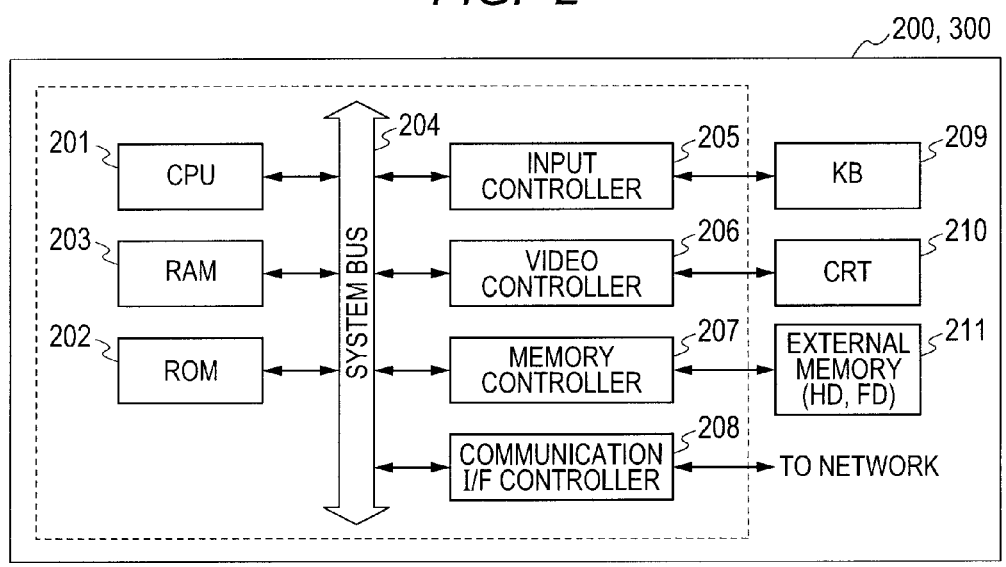
FIG. 2 is a block diagram illustrating a hardware construction of an information processing apparatus which can be applied to an IC card authenticating server 200 and a directory service server 300.

FIG. 2 is a block diagram illustrating the hardware construction of the information processing apparatus which can be applied to the IC card authenticating server 200 and the directory service server 300 illustrated in FIG. 1.

In FIG. 2, a CPU 201 integratedly controls each device and a controller connected to a system bus 204. A BIOS (Basic Input/Output System) and an operating system (hereinbelow, abbreviated to OS) as control programs of the CPU 201, various kinds of programs which are necessary to realize functions that are executed by each server or each PC (Personal Computer) and which will be described hereinafter, and the like have been stored in a ROM 202 or an external memory 211.

A RAM 203 functions as a main memory, a work area, or the like of the CPU 201. The CPU 201 reads out a program and the like necessary to execute processes from the ROM 202 or the external memory 211, loads them into the RAM 203, and executes the loaded program, thereby realizing various kinds of operations.

An input controller 205 controls an input from a keyboard (KB) 209, a pointing device such as a mouse (not shown), or the like. A video controller 206 controls a display onto a display device such as a CRT display (CRT) 210. Although the CRT 210 is shown in FIG. 2, the display device is not limited only to the CRT but may be another display device such as a liquid crystal display. The administrator uses those display devices according to necessity.

A memory controller 207 controls an access to the external memory 211, which comprises a hard disk (HD), a flexible disk (FD) or a compact flash (registered trademark) memory which is connected to a PCMCIA card slot through an adapter, in which a boot program, various kinds of applications, font data, a user file, an edition file, various kinds of data, and the like have been stored.

A communication I/F controller 208 is connected to and communicates with an external apparatus through a network (for example, LAN 400 illustrated in FIG. 1) and executes a communication control process on the network. For example, it can perform communication using TCP/IP or the like.

The CPU 201 executes, for example, a developing (rasterizing) process of an outline font into an area for display information in the RAM 203, thereby enabling a display on the CRT 201. The CPU 201 enables the user to instruct by using a mouse cursor or the like (not shown) on the CRT 210.

Various kinds of programs (for example, authentication information managing program), which will be described hereinafter, of the embodiment have been recorded in the external memory 211. They are loaded into the RAM 203 as necessary and executed by the CPU 201. Further, a definition file, various kinds of information tables, and the like which are used upon execution of the program have been also stored in the external memory 211 and their detailed description will be made hereinafter.

Subsequently, a hardware construction of a controller unit for controlling the multifunction apparatus 100 as an information processing apparatus of the invention will be described with reference to FIG. 3.

Figure 3:
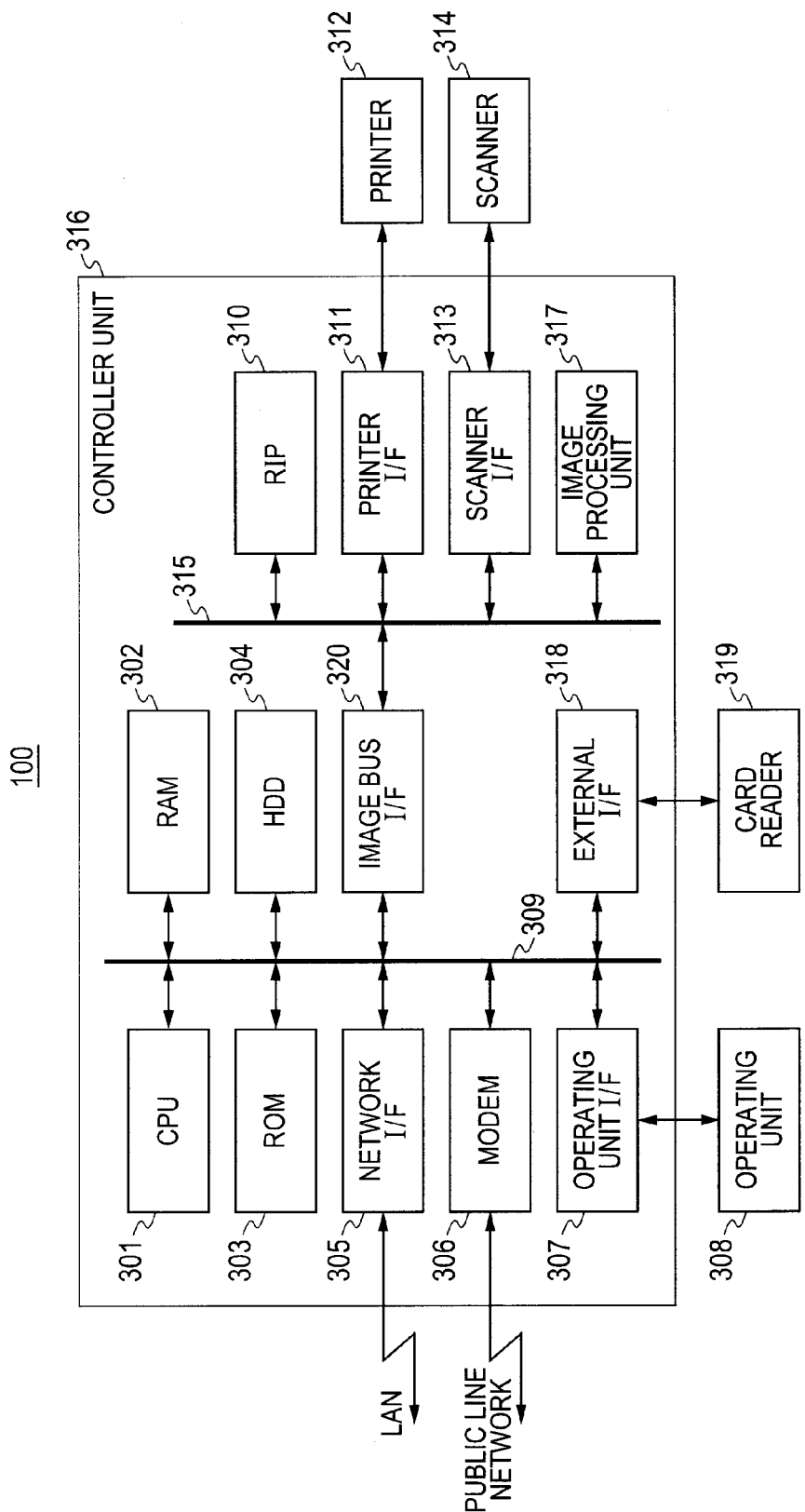
FIG. 3 is a block diagram illustrating an example of a hardware construction of a controller unit of a multifunction apparatus 100.

FIG. 3 is a block diagram illustrating an example of the hardware construction of the controller unit of the multifunction apparatus 100 illustrated in FIG. 1.

In FIG. 3, a controller unit 316 is connected to a scanner 314 which functions as an image input device and a printer 312 which functions as an image output device and is also connected to a LAN (for example, LAN 400 illustrated in FIG. 1) or a public line (WAN) (for example, PSTN, ISDN (registered trademark), or the like), thereby inputting and outputting image data and device information.

In the controller unit 316, a CPU 301 is a processor for controlling the whole system. A RAM 302 is a system work memory for allowing the CPU 301 to operate. The RAM 302 is also a program memory adapted to record the program or an image memory for temporarily recording the image data.

A boot program and various kinds of control programs of the system have been stored in a ROM 303. Various kinds of programs (for example, authentication information managing program) for controlling the system, the image data, and the like are stored in an external storage device (hard disk drive (HDD)) 304.

An operating unit interface (operating unit I/F) 307 is an interface unit to interface with an operating unit (UI) 308 and outputs the image data which is displayed on the operating unit 308 to the operating unit 308. The operating unit I/F 307 plays a role for transferring information (for example, user information or the like) which was input by the system user from the operating unit 308 to the CPU 301. The operating unit 308 is equipped with a display unit having a touch panel. By depressing (touch with a finger or the like) a button displayed in the display unit, the user can make various kinds of instructions.

A network interface (network I/F) 305 is connected to the network (LAN) and inputs and outputs data. A modem (MODEM) 306 is connected to the public line (WAN) and inputs and outputs data for transmission/reception of a facsimile (FAX) or the like.

An external interface (external I/F) 318 is an I/F unit for receiving an external input of USB, IEEE1394, a printer port, RS-232C, or the like. In the embodiment, a card reader 319 for reading the IC card which is necessary upon authentication is connected to the external I/F 318. The CPU 301 controls the information reading operation from the IC card by the card reader 319 through the external I/F 318 and can obtain the information read out of the IC card.

The invention is not limited to the IC card but may be another storage medium which can permit the user to use the image forming apparatus. In this case, individual key information (authentication information) for permitting the user to use the image forming apparatus is stored in the storage medium. A manufacturing number of the storage medium or a user code which is allocated to the user in a company may be used as key information. The foregoing devices are arranged on a system bus 309.

An image bus interface (IMAGE BUS I/F) 320 is a bus bridge for connecting the system bus 309 and an image bus 315 adapted to transfer the image data at a high speed and converting a data structure.

The image bus 315 is constructed by a PCI bus or IEEE1394. The following devices are arranged on the image bus 315.

A raster image processor (RIP) 310 develops, for example, vector data such as a PDL code into a bit map image. A printer interface (printer I/F) 311 connects a printer 312 and the controller unit 316 and executes a conversion of a synchronous system/asynchronous system of the image data. A scanner interface (scanner I/F) 313 connects the scanner 314 and the controller unit 316 and executes a conversion of the synchronous system/asynchronous system of the image data.

An image processing unit 317 executes a correction, a modification, and an edition to the input image data or executes a correction, a resolution conversion, and the like of the printer to the output image data. In addition to them, the image processing unit 317 executes a rotation of the image data and executes a compressing/decompressing process of JPEG to multivalue image data or a compressing/decompressing process of JBIG, MMR, MH, or the like to binary image data.

The scanner unit 314 irradiates an image on paper serving as an original and scans it by a CCD line sensor, thereby converting the image into an electric signal as raster image data. The original sheets are set onto a tray of a document feeder. When the apparatus user instructs a reading activation from the operating unit 308, the CPU 301 issues an instruction to the scanner 314, so that the feeder feeds the original sheets one by one and the reading operation of the original image is executed.

The printer unit 312 is a portion for converting the raster image data into the image on the sheet. As a converting method, there is an electrophotographic system using a photosensitive drum and a photosensitive belt, an ink jet system in which ink is discharged from a micronozzle array and an image is directly printed onto the sheet, or the like. Any one of them may be used.

The activation of the printing operation is started by an instruction from the CPU 301. The printer unit 312 has a plurality of sheet feeding stages so that different sheet sizes or different sheet directions can be selected and there are sheet cassettes corresponding to the sheet feeding stages.

The operating unit 308 has an LCD display unit. A touch panel sheet is adhered onto the LCD and an operating display screen of the system is displayed. When a displayed key is pressed, its position information is sent to the CPU 301 through the operating unit I/F 307. The operating unit 308 has, for example, a start key, a stop key, an ID key, a reset key, and the like as various kinds of operating keys.

The start key in the operating unit 308 is used when the reading operation of the original image is started or the like. LEDs of two colors of green and red are attached in a center portion of the start key. Whether or not the start key is in a ready state is shown by the color. The stop key in the operating unit 308 is used to stop the operation which is working. The ID key in the operating unit 308 is used when inputting the user ID of the user. The reset key is used when initializing settings from the operating unit.

The card reader 319 reads out information stored in the IC card (for example, Felica (registered trademark) made by Sony Corporation) and notifies the CPU 301 of the read information through the external I/F 318 under control of the CPU 301.

Figure 4:
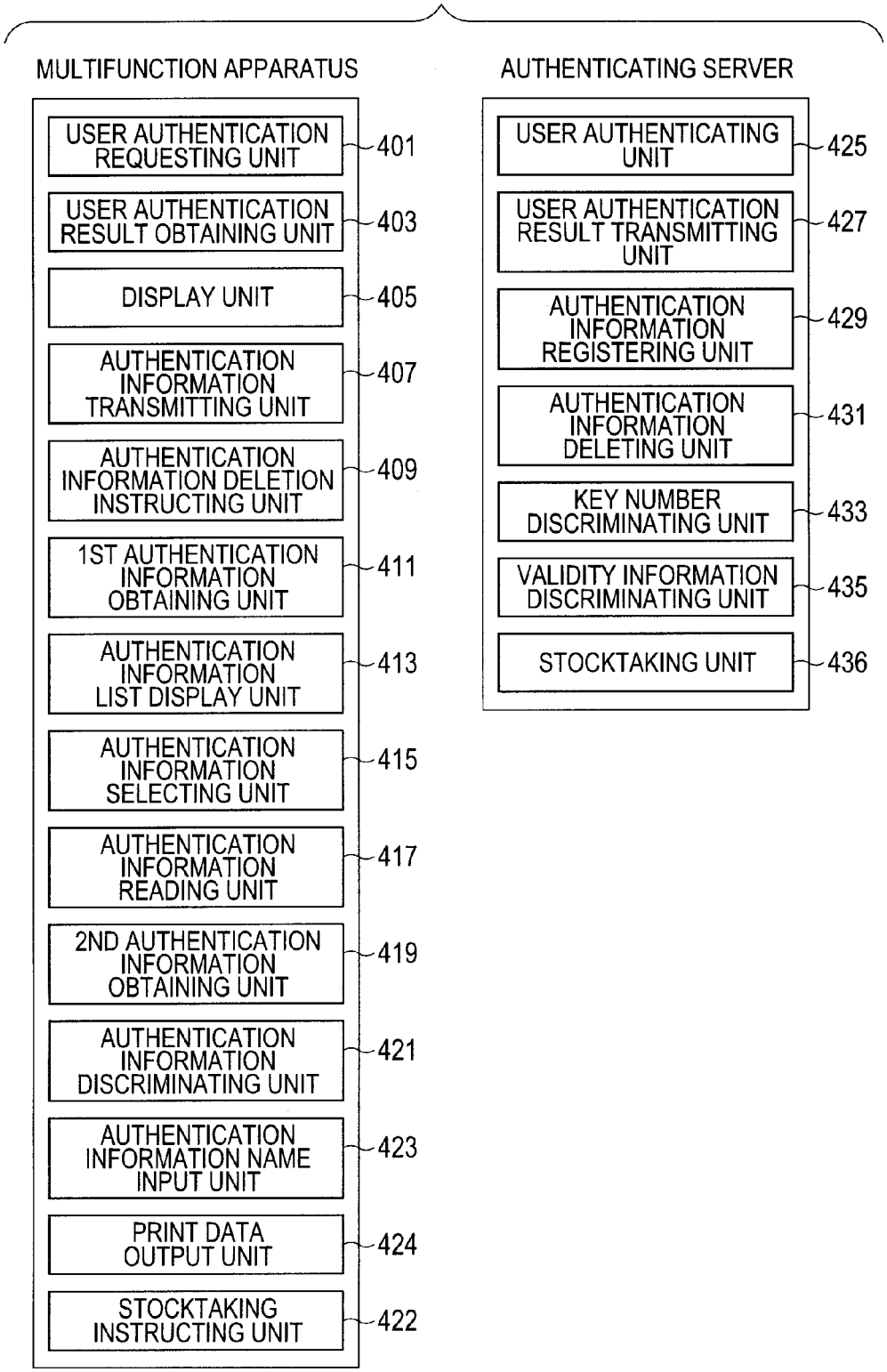
FIG. 4 is a functional block diagram of the multifunction apparatus 100 and an authenticating server 600 (IC card authenticating server 200, directory service server 300).

Subsequently, a functional block diagram of the multifunction apparatus 100 as an image forming apparatus of the invention and the authenticating server 600 (IC card authenticating server 200, directory service server 300) illustrated in FIG. 4 will be described.

Detailed control which is processed by each functional block will be described with reference to flowcharts, which will be described hereinafter.

A user authentication requesting unit 401 of the multifunction apparatus 100 obtains the user name, password, and user information of a user authentication (confirmation) destination which were input from the operating unit 308 by the operation of the user. The user authentication requesting unit 401 transmits the obtained user information as an authenticating request to the authenticating server 600 through the network I/F 305.

The user authentication requesting unit 401 corresponds to processes of steps S601 and S602, which will be described hereinafter.

A user authenticating unit 425 of the authenticating server 600 searches the IC card authenticating table (illustrated in FIG. 5, which will be described hereinafter) according to the user information received from the multifunction apparatus 100 through the communication I/F controller 208 and discriminates whether or not the user name included in the received user information exists.

The user authenticating unit 425 corresponds to processes of steps S603 and S604 and steps S801 to S807, which will be described hereinafter.

A user authentication result transmitting unit 427 of the authenticating server 600 transmits an authentication result discriminated by the user authenticating unit 425 to the multifunction apparatus 100.

The user authentication result transmitting unit 427 corresponds to a process of step S605, which will be described hereinafter.

A user authentication result obtaining unit 403 of the multifunction apparatus 100 obtains the authentication result from the authenticating server 600. If the authentication result indicative of authentication OK is obtained, the display is shifted to a display screen (illustrated in FIG. 10, which will be described hereinafter) for executing a registration or deletion of the card information of the IC card or a change in password of the user.

The user authentication result obtaining unit 403 corresponds to processes of steps S606 and S607, which will be described hereinafter.

A display unit 405 of the multifunction apparatus 100 displays a display screen (illustrated in FIG. 10, which will be described hereinafter) for switching modes to update the information onto the operating unit 308 of the multifunction apparatus 100. Specifically speaking, on the display screen, the operating mode can be switched to any one of a mode for registering the card information, a mode for deleting the card information, and a mode for changing the password in the user information.

The display unit 405 corresponds to processes of steps S608 and S901 to S906, which will be described hereinafter.

An authentication information transmitting unit 407 of the multifunction apparatus 100 transmits the card information of the IC card obtained by a second authentication information obtaining unit 419 so as to be registered by the authenticating server 600.

The authentication information transmitting unit 407 corresponds to a process of step S1103, which will be described hereinafter.

An authentication information deletion instructing unit 409 of the multifunction apparatus 100 instructs the authenticating server 600 to delete one or a plurality of card information of the users authenticated by the user authenticating unit 425.

The authentication information deletion instructing unit 409 corresponds to a process of step S1408, which will be described hereinafter.

A first authentication information obtaining unit 411 of the multifunction apparatus 100 obtains the card information of all of the users authenticated by the user authenticating unit 425 from the authenticating server 600.

The first authentication information obtaining unit 411 corresponds to processes of steps S1405, S2105, and S2205, which will be described hereinafter.

An authentication information list display unit 413 of the multifunction apparatus 100 displays a list of the card information obtained in the first authentication information obtaining unit 411.

The authentication information list display unit 413 corresponds to processes of steps S1406, S2106, and S2206, which will be described hereinafter.

An authentication information selecting unit 415 of the multifunction apparatus 100 enables the user to select the card information whose deletion is instructed by the authentication information deletion instructing unit 409 from the card information list displayed on the authentication information list display unit 413. The authentication information selecting unit 415 also enables the user to select the card information whose stocktaking is instructed by a stocktaking instructing unit 422.

The authentication information selecting unit 415 corresponds to processes of steps S1407, S2106, S2107, and S2207, which will be described hereinafter.

An authentication information reading unit 417 of the multifunction apparatus 100 reads out the card information of the IC card held over the card reader 319 by the user in order to execute the registering process, deleting process, or the like of the card information.

The second authentication information obtaining unit 419 of the multifunction apparatus 100 obtains the card information (for example, card number and the like) read out by the authentication information reading unit 417 by using the card reader 319 or the like. The second authentication information obtaining unit 419 transfers the obtained card information to the authentication information transmitting unit 407, an authentication information discriminating unit 421, or the like.

When obtaining the card information, a notification display screen (illustrated in FIGS. 12 and 16, which will be described hereinafter) is displayed and the user is notified so as to hold the IC card over the card reader 319.

The authentication information reading unit 417 and the second authentication information obtaining unit 419 correspond to processes of steps S1101 and S1407, which will be described hereinafter.

The authentication information discriminating unit 421 of the multifunction apparatus 100 discriminates whether or not the card information selected in the authentication information selecting unit 415 and the card information obtained in the second authentication information obtaining unit 419 coincide.

If they coincide, the card information selected in the authentication information selecting unit 415 by the user is set to a deletion target and the authentication information deletion instructing unit 409 instructs the authenticating server 600 to delete the card information.

The authentication information discriminating unit 421 corresponds to a process of step S1407, which will be described hereinafter.

An authentication information name input unit 423 corresponds to FIG. 13 and receives the input of the card name which was input to the user on the display screen of FIG. 13.

Figure 20:
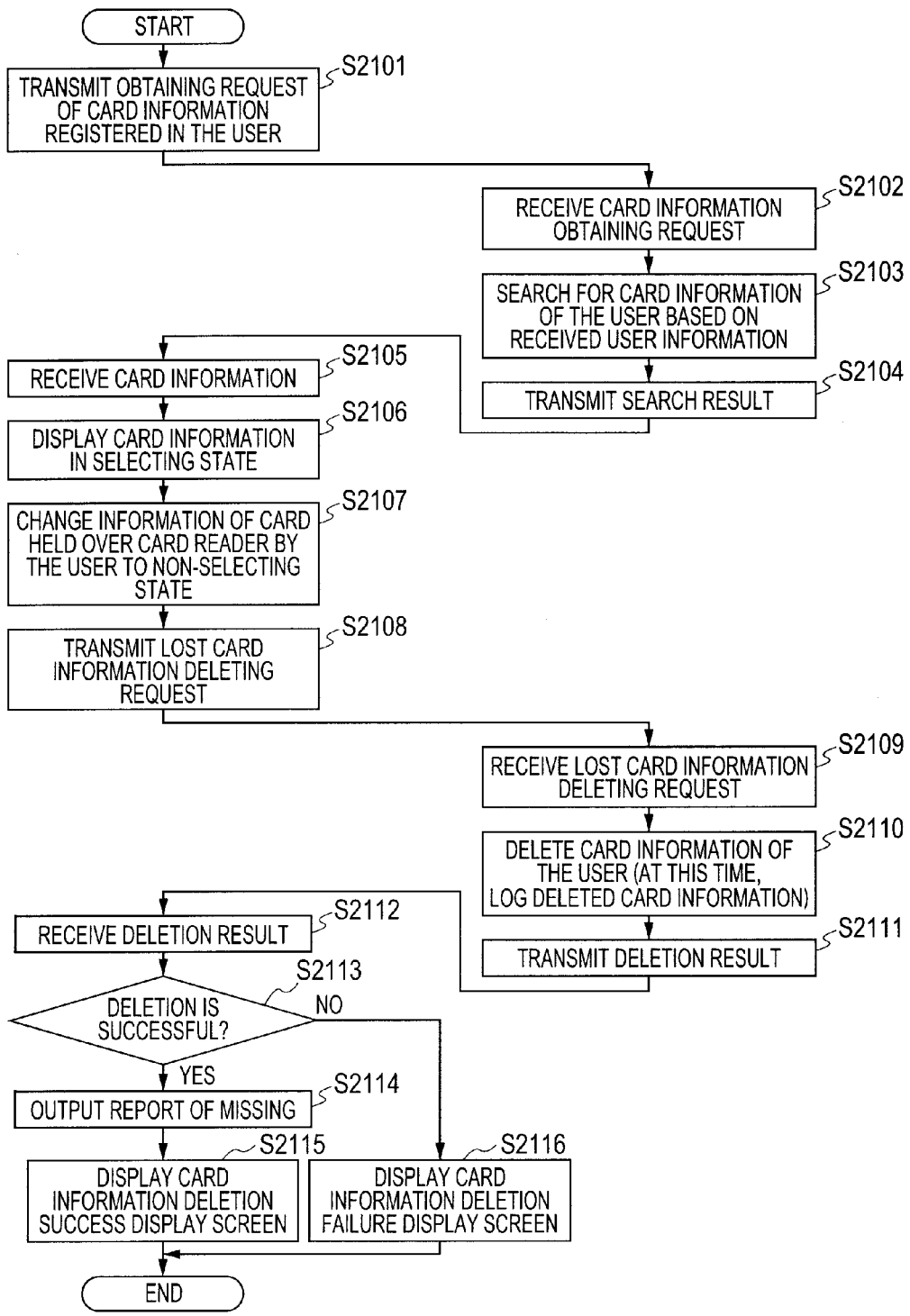
FIG. 20 is a flowchart illustrating an example of a control procedure at the time of the deletion of the lost card information in the authentication information management system 1 of the invention.

The print data output unit corresponds to step S2114 in FIG. 20, forms print data of a report of missing, and controls an output to the image processing unit 317 of the multifunction apparatus 100.

Figure 22:
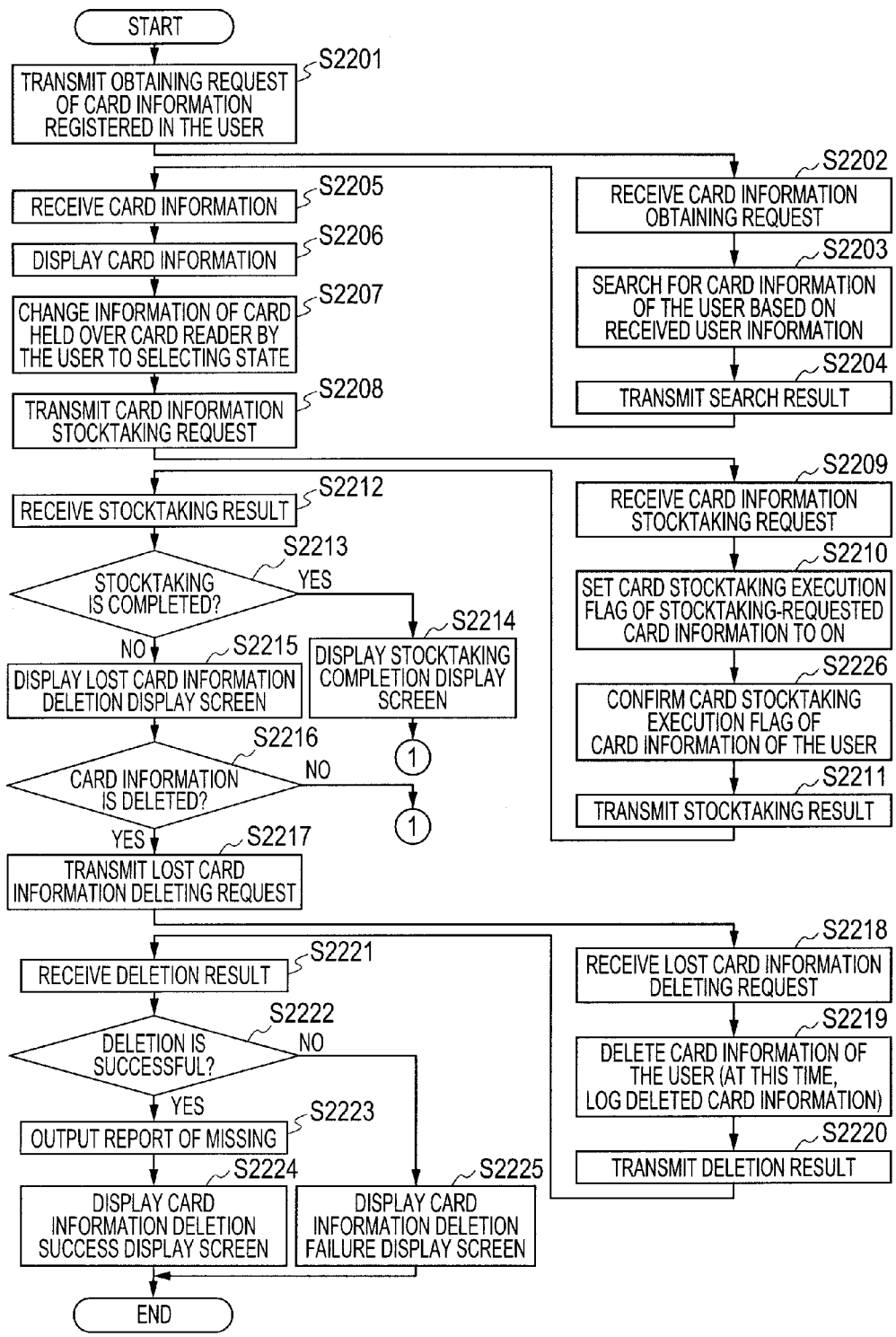
FIG. 22 is a flowchart illustrating an example of a control procedure at the time of the card stocktaking in the authentication information management system 1 of the invention.

The stocktaking instructing unit corresponds to step S2206 in FIG. 22 and transmits a stocktaking request including the card information selected by holding the IC card with the card reader to the authenticating server 600.

Figure 10:
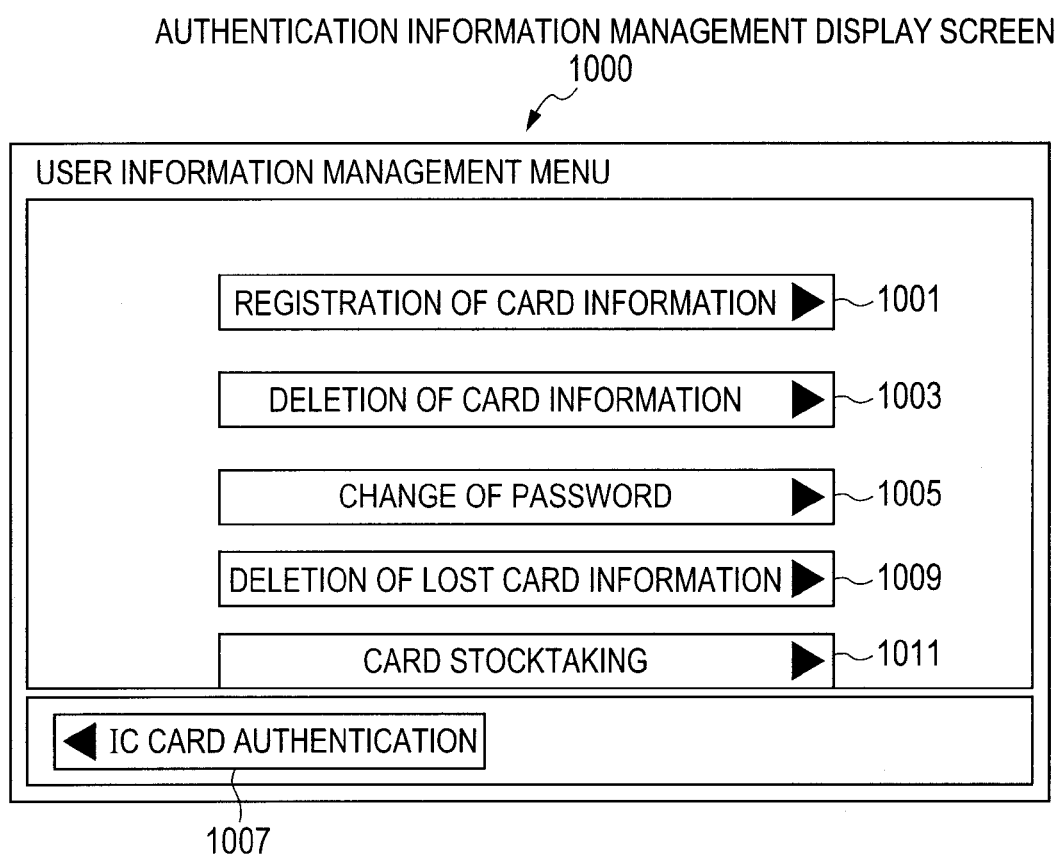
FIG. 10 is a diagram illustrating an authentication information management display screen 1000 in the authentication information management system 1 of the invention.

In the embodiment when the card information is deleted (in the case where a button 1001 in FIG. 10 is pressed), first, the card information of all of the users authenticated in the user authenticating unit 425 is obtained in the first authentication information obtaining unit 411. A list of the obtained card information is displayed on the authentication information list display unit 413. In the authentication information selecting unit 415, the user is made to select the card information to be deleted from the list. Subsequently, in the authentication information reading unit 417, the user is made to read the IC card corresponding to the card information to be deleted. The read card information is obtained by the second authentication information obtaining unit 419. Further, the card information selected by the user in the authentication information selecting unit 415 and the card information obtained by the second authentication information obtaining unit 419 are compared by the authentication information discriminating unit 421. If the card information coincides, the authentication information deletion instructing unit 409 transmits the coincident card information to the IC card authenticating server 200, thereby allowing the card information to be deleted from the IC card authenticating table (illustrated in FIG. 5, which will be described hereinafter).

Although the embodiment has been constructed so that the card information is deleted by holding the IC card over the card reader, it can be also deleted without holding the IC card over the card reader.

At the time of the deletion of the lost card information (when a button 1009 in FIG. 10 is pressed), first, the card information of all of the users authenticated by the user authenticating unit 425 is obtained by the first authentication information obtaining unit 411. A list of the obtained card information is displayed by the authentication information list display unit 413. The IC card owned by the user (IC card which is not deleted) among the IC cards is read out of the list by the authentication information reading unit 417. The read card information is obtained by the second authentication information obtaining unit 419. Further, the card information selected by the user in the authentication information selecting unit 415 and the card information obtained by the second authentication information obtaining unit 419 are compared by the authentication information discriminating unit 421. When the card information coincides, the coincident card information is set to the non-selecting state and the dissident card information is set to the selecting state by the authentication information selecting unit 415. The authentication information deletion instructing unit 409 transmits the dissident card information in the selecting state to the IC card authenticating server 200, thereby allowing the card information to be deleted from the IC card authenticating table (illustrated in FIG. 5, which will be described hereinafter).

Further, at the time of the stocktaking of the IC card (when a button 1011 in FIG. 10 is pressed), first, the card information of all of the users authenticated by the user authenticating unit 425 is obtained by the first authentication information obtaining unit 411. A list of the obtained card information is displayed by the authentication information list display unit 413. The stocktaking target IC card owned by the user is read out of the list by the authentication information reading unit 417. The read card information is obtained by the second authentication information obtaining unit 419. Further, the card information selected by the user in the authentication information selecting unit 415 and the card information obtained by the second authentication information obtaining unit 419 are compared by the authentication information discriminating unit 421. When the card information coincides, the coincident card information is set to the selecting state and the dissident card information is set to the non-selecting state by the authentication information selecting unit 415. The authentication information deletion instructing unit 409 transmits the coincident card information in the selecting state to the IC card authenticating server 200, thereby turning on a stocktaking flag of the target card information stored in the IC card authenticating table (illustrated in FIG. 5, which will be described hereinafter) by a stocktaking unit 436. After that, in order to delete the card information whose stocktaking could not be performed, the authentication information deletion instructing unit 409 transmits the card information whose stocktaking could not be performed to the IC card authenticating server 200.

An authentication information registering unit 429 of the authenticating server 600 executes a registering process of the card information into the IC card authenticating table (illustrated in FIG. 5, which will be described hereinafter) in response to a registering instruction received from the multifunction apparatus 100.

The authentication information registering unit 429 corresponds to processes of steps S1104 to S1113.

An authentication information deleting unit 431 of the authenticating server 600 executes a deleting process of the card information from the IC card authenticating table (illustrated in FIG. 5, which will be described hereinafter) in response to a deleting instruction received from the multifunction apparatus 100.

The authentication information deleting unit 431 corresponds to processes of steps S1409 to S1411, which will be described hereinafter.

A key number discriminating unit 433 of the authenticating server 600 discriminates whether or not the card information of the card which is registered is included in the card information of the user by comparing a card number (key number) at the time of the registering process in the authentication information registering unit 429.

If it is determined by the key number discriminating unit 433 that the card information of the card of the same card number as that of the card which is registered is included in the card information of the user, a validity information discriminating unit 435 compares validity information of the card which is registered and validity information of the card of the same card number as that of the card which is registered in the card information of the user, thereby discriminating whether or not they coincide.

Processes of the key number discriminating unit 433 and the validity information discriminating unit 435 correspond to processes of steps S1106, S1107, and S1110, which will be described hereinafter.

Figure 23:
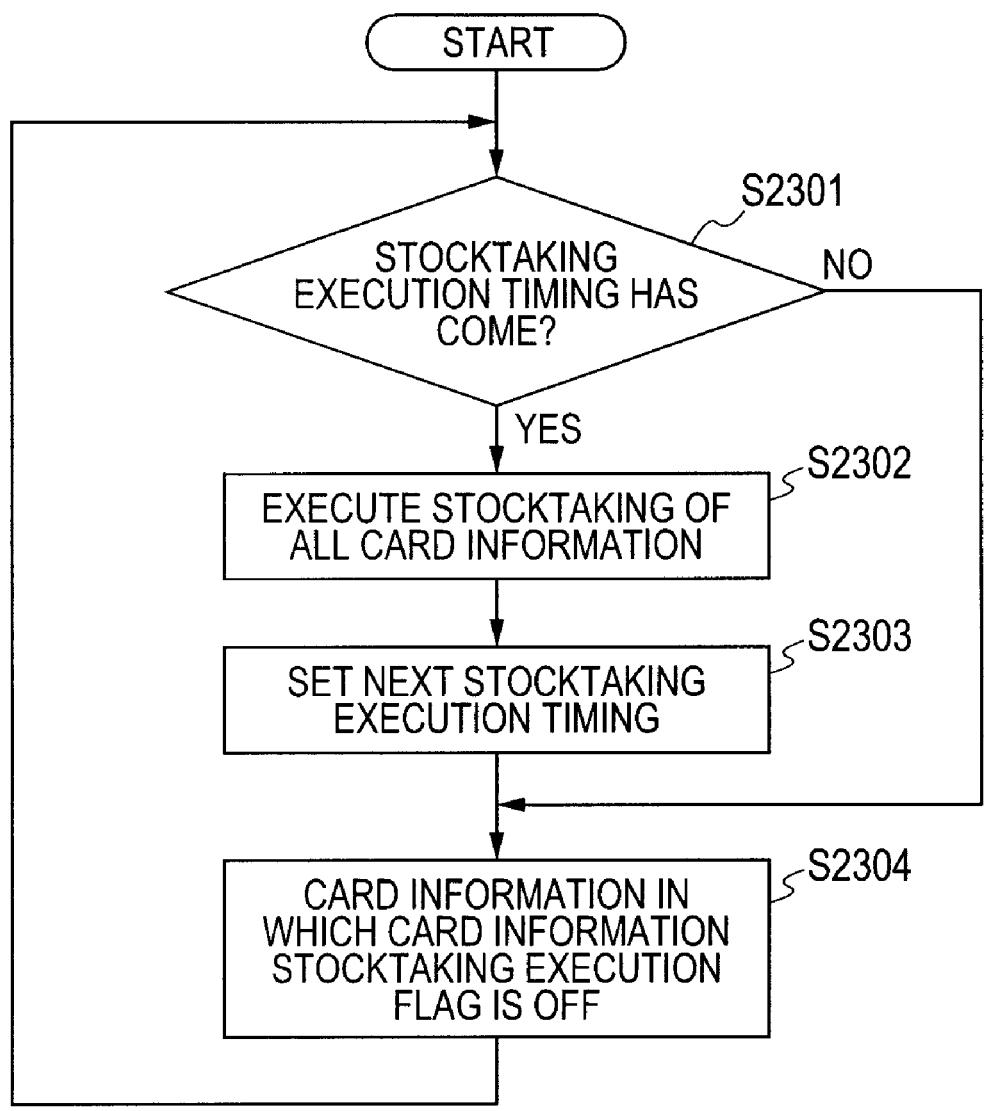
FIG. 23 is a flowchart illustrating an example of a control procedure at the time of performing a stocktaking notification and a confirmation of the card information whose stocktaking is not executed yet in the authentication information management system 1 of the invention.

The stocktaking unit 436 corresponds to processes of steps S2209 to S2211 in FIG. 22 and processes in FIG. 23, updates the IC card authenticating table, and notifies the user at stocktaking timing.

The IC card authenticating table which is used at the time of a use permission of the multifunction apparatus 100 and a user authentication will be described here with reference to FIG. 5.

Figure 5:
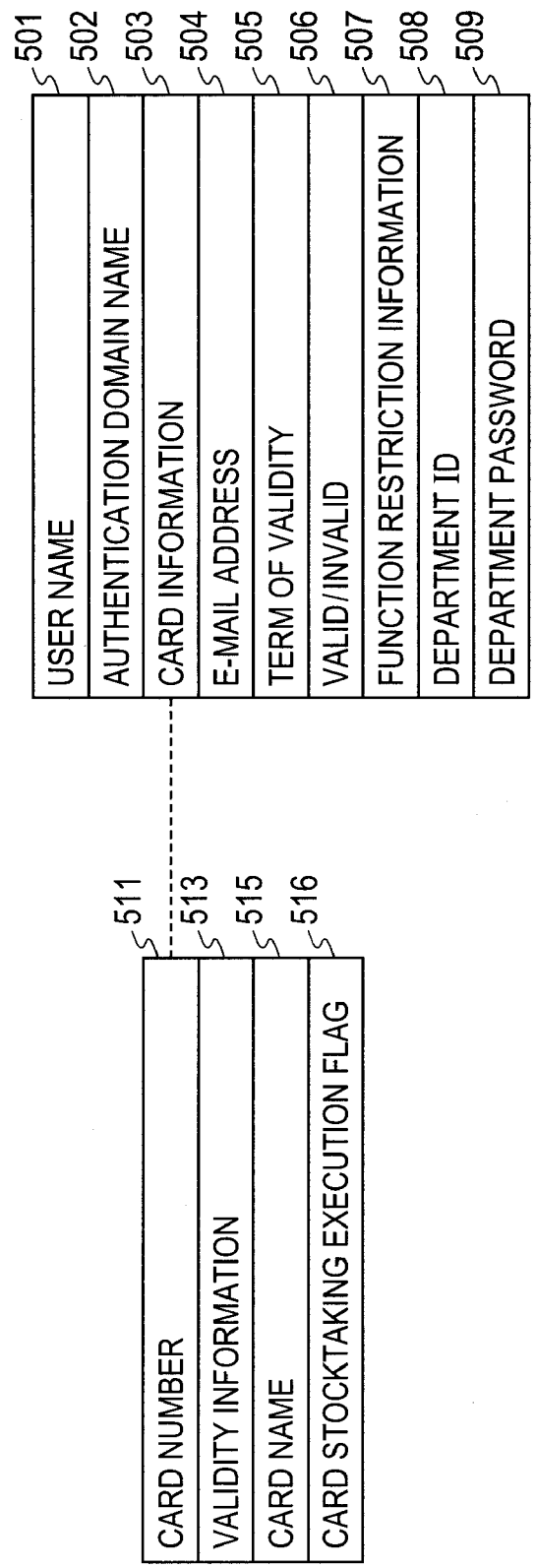
FIG. 5 is a data constructional diagram illustrating an example of an IC card authenticating table 5 in the authentication information management system 1 of the invention.

FIG. 5 is a data constructional diagram illustrating an example of the IC card authenticating table 5 in the authentication information management system 1 of the invention.

As illustrated in FIG. 5, the IC card authenticating table 5 is constructed by information of a user name 501, an authentication domain name 502, card information 503, an E-mail address 504, a term of validity 505, valid/invalid 506, function restriction information 507, a department ID 508, a department password 509, and the like. The card information 503 includes a card number 511, validity information 513, a card name 515, and a card stocktaking execution flag 516. A plurality of card information can be registered for one user. In other words, in the IC card authenticating table, the user name (user information to identify the user) and card numbers 511 of a plurality of IC cards (first authentication information included in a plurality of storage media) have been stored in correspondence to each other.

The user name 501 is a name of the user who uses the multifunction apparatus 100.

The authentication domain name 502 indicates a position on the network where the server of an authentication destination exists. The authentication destination is the IC card authenticating server 200, the directory service server 300, or the like.

The card information 503 is card information of the IC card for the user to use the multifunction apparatus 100. In the embodiment, the card information 503 of the IC card is, that is, authentication information adapted to permit use of the multifunction apparatus 100 (image forming apparatus). The card information 503 includes the card number 511, validity information 513, card name 515, and card stocktaking execution flag 516.

The card number 511 is a string of numerals or characters for identifying each card.

The validity information 513, card name 515, and card stocktaking execution flag 516 will be described hereinafter.

The E-mail address 504 is an E-mail address owned by the user and is used when a notification about use of the multifunction apparatus 100 is transmitted from the multifunction apparatus 100 to the user, or the like.

The term of validity 505 is a term of validity of use of the multifunction apparatus 100 which has been predetermined for the user. When the term of validity has expired, the user cannot use the multifunction apparatus 100.

The valid/invalid 506 is information showing whether or not the user can use the multifunction apparatus 100. If the multifunction apparatus 100 is not used, information showing invalidity is written.

The function restriction information 507 indicates the contents of restriction regarding use of the multifunction apparatus 100 which has been preset for the user.

For example, the contents of function restriction are expressed by a numeral string of four digits. It is assumed that the first digit indicates the restriction contents about use of a copy function, the second digit indicates the restriction contents about use of a printer function, the third digit indicates the restriction contents about use of a scanner function, and the fourth digit indicates the restriction contents about use of a facsimile (FAX) function. With respect to each digit, it is assumed that 0="cannot be used" and 1="can be used", or the like. In the case of the user who can use only the copy function and the FAX function, the function restriction information is equal to "1001".

The department ID 508 is an ID showing an in-house department to which the user belongs. The department password 509 is a password associated with the department ID 508.

In the embodiment, among the items in the IC card authenticating table 5, the items other than the card information 503 are preliminarily registered by the administrator or are registered at the time of user management.

An outline regarding the validity information 513, card name 515, and card stocktaking execution flag 516 in the card information 503 will be described hereinbelow.

The validity information 513 in the card information 503 is information of numerical values registered in the IC card. For example, when the IC card is lost, such information is used to distinguish the lost IC card from the IC card which was issued again.

By adding 1 to a value from the validity information of the lost IC card and issuing the IC card again, the IC card can be distinguished from the lost IC card. An abuse of the lost IC card can be prevented and the security can be held.

When the card number of the IC card is displayed on a card information deletion display screen (illustrated in FIG. 15, which will be described hereinafter) or the like, the card name 515 is displayed together with the card number, thereby enabling the user to easily discriminate. The card name can be set on a card registration/card name input display screen (illustrated in FIG. 13, which will be described hereinafter) at the time of registration of the card information.

The card stocktaking execution flag 516 is a flag showing the presence or absence (ON/OFF) of execution of the card stocktaking. When a stocktaking execution date of the card held in the IC card authenticating server 200 comes, the card stocktaking execution flags 516 of all of the card information are set to OFF, thereby notifying the user of a stocktaking executing request by E-mail.

The user executes the stocktaking of the card information on a card information stocktaking display screen (illustrated in FIG. 21, which will be described hereinafter) of the multifunction apparatus 100. The card stocktaking execution flag 516 of the card information whose stocktaking has been executed is set to ON.

The user information managing process, card information registration, card information deletion, and password change in the authentication information management system 1 of the embodiment will be described hereinbelow with reference to flowcharts and diagrams of FIGS. 6 to 18.

First, the user information managing process in the authentication information management system 1 of the embodiment will be described hereinbelow with reference to FIG. 6.

Figure 6:
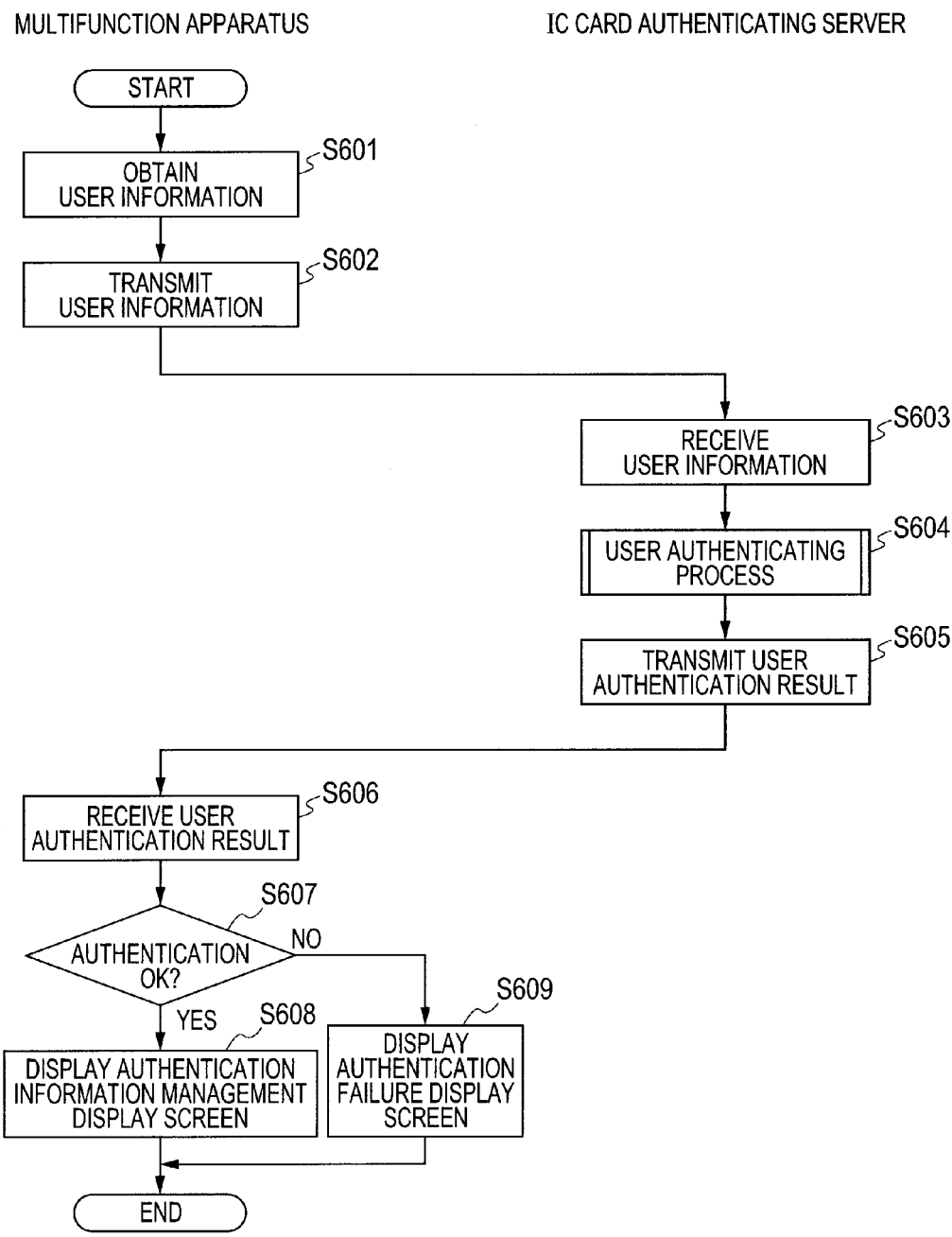
FIG. 6 is a flowchart illustrating an example of a user information managing process in the authentication information management system 1 of the invention.

FIG. 6 is the flowchart illustrating an example of the user information managing process in the authentication information management system 1 of the invention.

This process is executed by the multifunction apparatus 100 and the IC card authenticating server 200.

First, when the user presses a "user information management" button (not shown) provided for the multifunction apparatus 100, a user authentication display screen is displayed.

Figure 7:
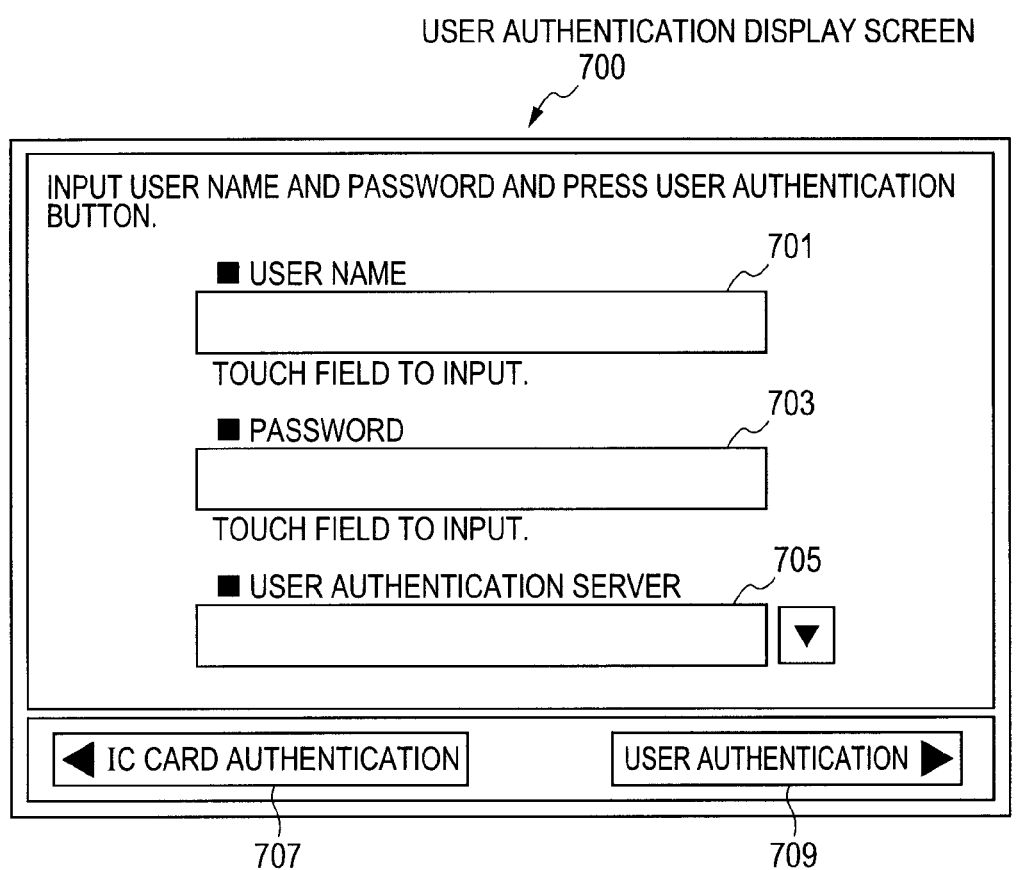
FIG. 7 is a diagram illustrating a user authentication display screen 700 in the authentication information management system 1 of the invention.

FIG. 7 is the diagram illustrating a user authentication display screen 700 in the authentication information management system 1 of the invention.

The user authentication display screen 700 has a user name input unit 701, a password input unit 703, a user authentication server selecting unit 705, an IC card authentication button 707, and a user authentication button 709.

A message for allowing the user information to be input is displayed. For example, a message "Input user name and password and press user authentication button." is displayed. The user name input unit 701 is used to input the user name.

The password input unit 703 is used to input the password corresponding to the user name.

The user authentication server selecting unit 705 is used to select the server for making the user authentication. As the user authentication server, the IC card authenticating server 200, directory service server 300, and the like exist.

The IC card authentication button 707 is used to display a display screen (not shown) for allowing the user to hold the IC card over the card reader at the time of the printing process.

The user authentication button 709 is used to transmit the input contents to the server for making the user authentication.

In step S601, the user name, password, and user authentication destination (user authentication server) which were input by the user operation on the user authentication display screen are obtained. As a user authentication destination, the IC card authenticating server 200 or the directory service server 300 such as Active Directory (registered trademark) of Windows (registered trademark) or LDAP server exists.

The obtained user name, password, and user authentication destination are stored into the RAM 302 and used in processes of steps S1103 and S1401, which will be described hereinafter.

In step S602, the multifunction apparatus 100 transmits the user name, password, and user authentication destination obtained in step S601 to the IC card authenticating server 200 according to the user operation.

In step S603, the IC card authenticating server 200 receives the user name, password, and user authentication destination.

In step S604, the IC card authenticating server 200 executes the user authenticating process based on the information received in step S603.

The user authenticating process will be described hereinafter with reference to a flowchart of FIG. 8.

Although the invention has been constructed in such a manner that after the user pressed the "user information management" button (not shown), he inputs the user name, password, and user authentication destination and executes the registering process and deleting process, which will be described hereinafter, the invention is not limited to such a construction. For example, it is also possible to construct in such a manner that the IC card is held over the card reader equipped for the multifunction apparatus 100, the card number included in the IC card is transmitted to the IC card authenticating server 200, and when the IC card is authenticated, the registering process and deleting process, which will be described hereinafter, are executed.

Since the user can arbitrarily store information other than the manufacturing number of the card into the IC card, for example, a staff number or the like allocated to each user in a company has been embedded in the IC card. In this case, the authenticating process can be also executed by using the staff number (user information).

In step S605, the IC card authenticating server 200 transmits a user authentication result (authentication OK or authentication NG) of step S604 to the multifunction apparatus 100.

The multifunction apparatus 100 receives the user authentication result in step S606.

In step S607, the multifunction apparatus 100 discriminates the user authentication result received in step S606.

If the authentication is OK, the multifunction apparatus 100 displays an authentication information management display screen (illustrated in FIG. 10, which will be described hereinafter) (step S608).

If the authentication is NG, the multifunction apparatus 100 displays an authentication failure display screen (not shown) (step S609).

The user authenticating process of the IC card authenticating server 200 in the authentication information management system 1 of the embodiment will be described with reference to FIG. 8.

Figure 8:
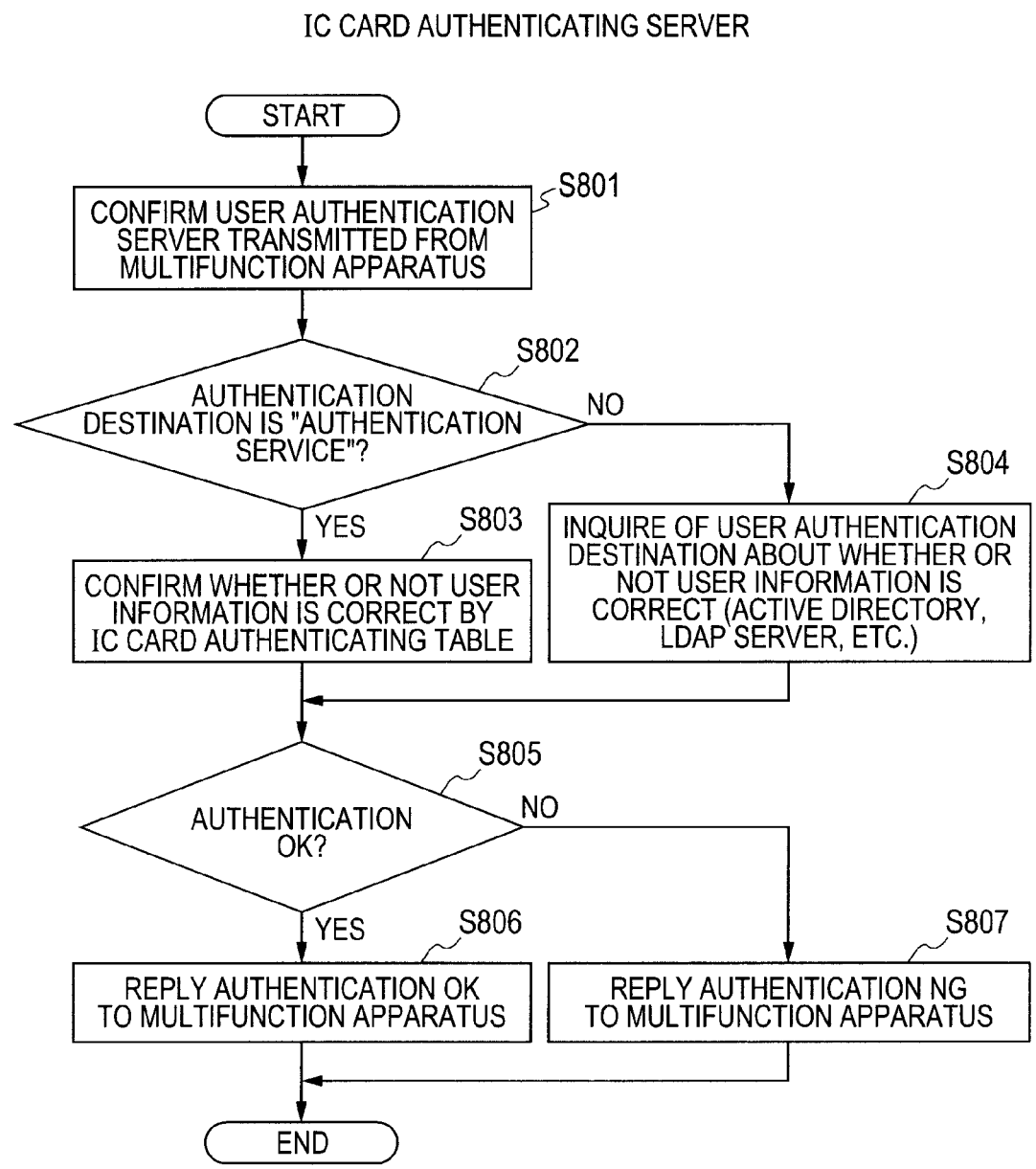
FIG. 8 is a flowchart illustrating an example of a user authenticating process of the IC card authenticating server 200 in the authentication information management system 1 of the invention.

FIG. 8 is the flowchart illustrating an example of the user authenticating process of the IC card authenticating server 200 in the authentication information management system 1 of the invention.

In step S801, the IC card authenticating server 200 obtains the user authentication destination from the user name, password, and user authentication destination received in step S603 mentioned above and confirms them.

In the embodiment, there are a case where the user authentication destination is "authentication service" and other cases (step S802).

If the user authentication destination is "authentication service", the IC card authenticating server 200 executes the authenticating process to the user information which is managed in the IC card authenticating table 5 (step S803).

In the other cases, the authenticating process is executed to the designated authentication destination such as Active Directory (registered trademark) of Windows (registered trademark), LDAP server (directory service server 300), or the like (step S804).

In the authenticating process, whether or not the user information is correct, that is, whether or not the user name included in the user information exists in the authentication table held in the authentication destination.

In step S805, the IC card authenticating server 200 obtains a result of the user authenticating process executed in step S803 or S804, that is, a result of the discrimination about whether or not the user information is correct (whether or not the user name exists) and discriminates the authentication result.

If the user information is correct, a reply of the authentication OK is made to the multifunction apparatus 100 (step S806).

If the user information is not correct, a reply of the authentication NG is made to the multifunction apparatus 100 (step S807).

Control on the authentication information management display screen of the multifunction apparatus 100 in the authentication information management system 1 of the embodiment will be described with reference to FIG. 9.

Figure 9:
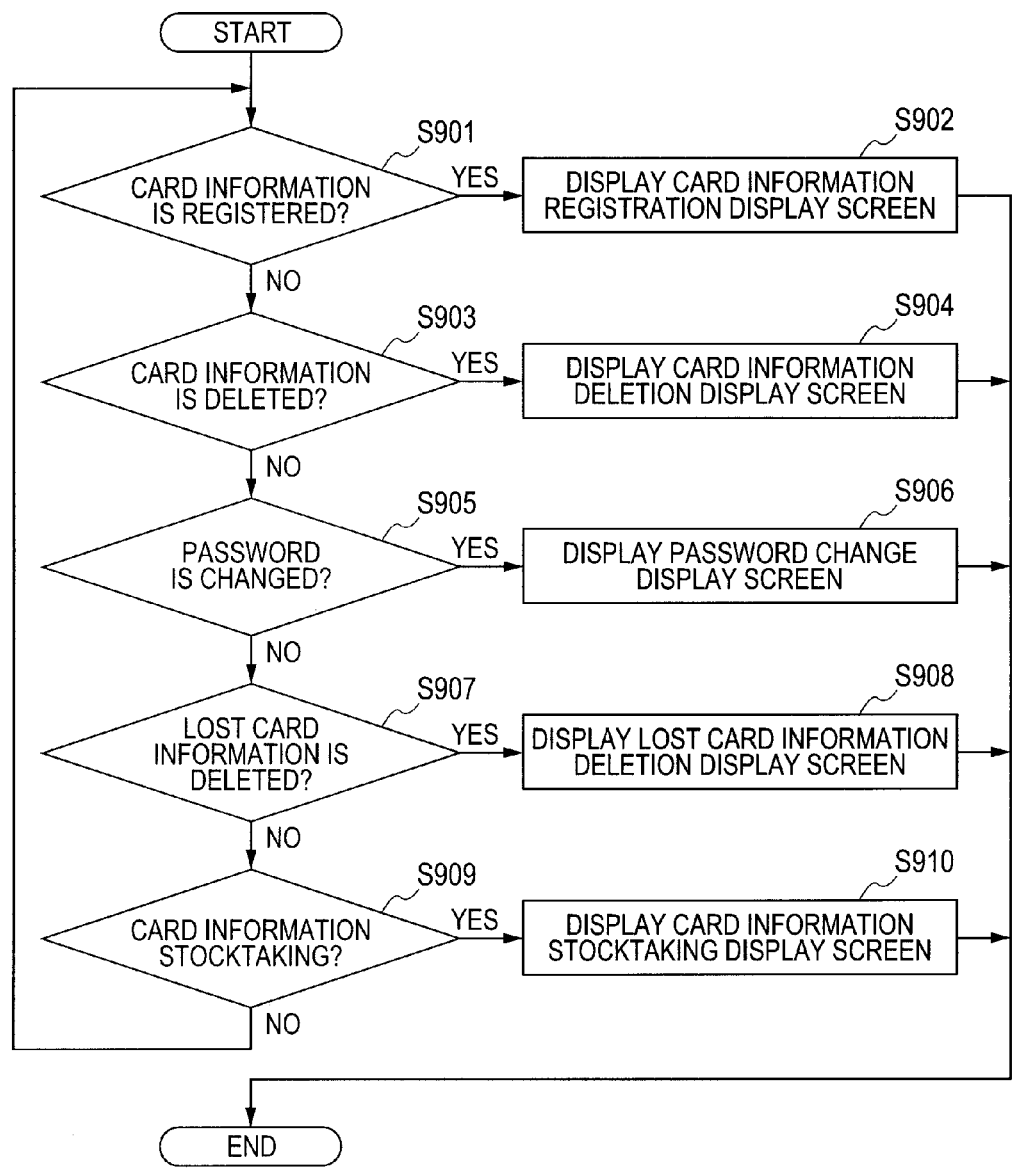
FIG. 9 is a flowchart illustrating an example of a control procedure on an authentication information management display screen of the multifunction apparatus 100 in the authentication information management system 1 of the invention.

FIG. 9 is a flowchart illustrating an example of a control procedure on the authentication information management display screen of the multifunction apparatus 100 in the authentication information management system 1 of the invention.

In step S606, when the multifunction apparatus 100 receives the authentication result indicative of authentication OK from the IC card authenticating server 200, the multifunction apparatus 100 displays an authentication information management display screen 1000 in step S608 and executes control illustrated in the flowchart of FIG. 9.

FIG. 10 is a diagram illustrating the authentication information management display screen 1000 in the authentication information management system 1 of the invention. The screen 1000 is displayed in step S608.

The authentication information management display screen 1000 illustrated in FIG. 10 has: a card information registration button 1001; a card information deletion button 1003; a password changing button 1005; an IC card authentication button 1007; the lost card information deletion button 1009; and the card stocktaking button 1011.

The card information registration button 1001 is a button to shift to a process of the card information registration.

The card information deletion button 1003 is a button to shift to a process of the card information deletion.

The password changing button 1005 is a button to shift to a process of the password change.

The lost card information deletion button 1009 is a button to shift to a process for deleting the lost card information from the IC card authenticating table 5 which is managed by the IC card authenticating server 200 and outputting a report of missing.

The card stocktaking button 1011 is a button to shift to a process of the card stocktaking process.

The card stocktaking button 1011 is controlled so as to be displayed for a predetermined time (stocktaking execution timing in a manner similar to step S2301, which will be described hereinafter).

The IC card authentication button 1007 is a button to display a display screen (not shown) for allowing the user to hold the IC card over the card reader at the time of the printing process.

In step S901, the multifunction apparatus 100 discriminates whether or not the card information registration 1001 has been selected by the user operation on the authentication information management display screen 1000 illustrated in FIG. 10. When the card information registration 1001 is selected, the operating mode is set to a registering mode.

When the card information registration 1001 is selected, a card information registration display screen (illustrated in FIG. 12, which will be described hereinafter) is displayed in step S902.

In step S903, the multifunction apparatus 100 discriminates whether or not the card information deletion 1003 has been selected by the user operation on the authentication information management display screen 1000 illustrated in FIG. 10. When the card information deletion 1003 is selected, the operating mode is set to a deleting mode.

When the card information deletion 1003 is selected, a card information deletion display screen (illustrated in FIG. 15, which will be described hereinafter) is displayed in step S904.

In step S905, the multifunction apparatus 100 discriminates whether or not the password change 1005 has been selected by the user operation on the authentication information management display screen 1000 illustrated in FIG. 10. When the password change 1005 is selected, the operating mode is set to a password changing mode.

When the password change 1005 is selected, a password change display screen (illustrated in FIG. 18, which will be described hereinafter) is displayed in step S906.

In step S907, the multifunction apparatus 100 discriminates whether or not the lost card information deletion 1009 has been selected by the user operation on the authentication information management display screen 1000 illustrated in FIG. 10. When the lost card information deletion 1009 is selected, the operating mode is set to a lost card information deleting mode.

When the lost card information deletion 1009 is selected, a lost card information deletion display screen (illustrated in FIG. 19, which will be described hereinafter) is displayed in step S908.

In step S909, the multifunction apparatus 100 discriminates whether or not the card stocktaking 1011 has been selected by the user operation on the authentication information management display screen 1000 illustrated in FIG. 10. When the card stocktaking 1011 is selected, the operating mode is set to a card stocktaking mode.

When the card stocktaking 1011 is selected, a card stocktaking display screen (illustrated in FIG. 21, which will be described hereinafter) is displayed in step S910.

In the following description for the processes of the card information registration, card information deletion, password change, lost card information deletion, and card stocktaking, the processes of the registration, deletion, and change are executed to the IC card authenticating table 5 provided for the IC card authenticating server 200.

However, in the case where the card information is managed by the directory service server 300 such as Active Directory (registered trademark) of Windows (registered trademark) or LDAP server, the processes of the registration, deletion, and change can be also executed to the information of Active Directory (registered trademark) of Windows (registered trademark) or the LDAP server according to the user authentication destination. In this case, those processes can be executed through the IC card authenticating server 200 or can be also executed without intervention of the IC card authenticating server 200.

That is, the IC card authenticating server 200 and the directory service server 300 (Active Directory (registered trademark) of Windows (registered trademark), LDAP server, or the like) are arranged in the same casing and can be considered as one authenticating server 600.

The authenticating server 600 can be arbitrarily constructed by the operation of the user.

Processes in the case where the card information registration display screen is displayed in step S902 in the authentication information management system 1 of the embodiment will now be described with reference to FIG. 11.

FIG. 11 is a flowchart illustrating an example of a control procedure at the time of the card information registration in the authentication information management system 1 of the invention.

When the card information registration is selected in step S901 mentioned above, the card information registration display screen is displayed in step S902.

FIG. 12 is the diagram illustrating a card information reading display screen 1200 at the time of the card information registration in the authentication information management system 1 of the invention.

A message for allowing the IC card which is registered to be held over the card reader 319 is displayed on the card information reading display screen 1200. For example, a message "Card information is registered into authenticating service. Touch card reader with card to be registered." is displayed.

The card information reading display screen 1200 has: a return button 1201 for displaying a previous display screen; and an OK button 1203 for deciding the card information of the IC card held over the card reader.

In step S1101, when the IC card is held over the card reader 319 by the user operation in response to an instruction on the card information reading display screen 1200, the multifunction apparatus 100 obtains the card number and the validity information read out of the card reader 319.

In step S1102, the multifunction apparatus 100 displays the card registration/card name input display screen for registering the card name for the card number and the validity information which were read out in step S1101.

FIG. 13 is a diagram illustrating a card registration/card name input display screen 1300 in the authentication information management system 1 of the invention.

The card registration/card name input display screen 1300 displays: a message for registering the card information of the IC card obtained in step S1101; and the card information (card number). For example, a message "Card information is registered into authenticating service. If you approve, press "OK" button." is displayed.

The card registration/card name input display screen 1300 has a card name (authentication information name) input unit 1301 for registering an arbitrary name into the IC card. The card name is used for the user to discriminate the IC card.

In addition, the card registration/card name input display screen 1300 has: a return button 1303 for displaying a previous display screen; and an OK button 1305 for deciding the registered contents and transmitting them to the IC card authenticating server 200.

In step S1103, the multifunction apparatus 100 transmits the card information (card number, validity information, card name) which had been obtained in step S1101 and was input in step S1102 and the user information (user name, user authentication destination) obtained in step S601 to the IC card authenticating server 200 according to the user operation.

In step S1104, the IC card authenticating server 200 receives the card information and the user information transmitted in step S1103.

In step S1105, the IC card authenticating server 200 searches for the card information associated with the user information received in step S1104 from the IC card authenticating table 5.

In step S1106, the IC card authenticating server 200 compares the card information received in step S1104 with the card information searched for in step S1105.

In step S1107, if it is determined from a comparison result of step S1106 that the card information of the same card number as that of the card information received in step S1104 exists in the card information searched for in step S1105, the IC card authenticating server 200 executes a process of step S1110.

If the card information of the same card number does not exist, since this means that new card information is added, a process of step S1108 is executed.

In step S1108, the IC card authenticating server 200 registers the card information received in step S1104 for the relevant user in the IC card authenticating table 5.

If the relevant user does not exist in the IC card authenticating table 5 (that is, a case where the user exists in the directory service server 300 such as Active Directory (registered trademark) of Windows (registered trademark) or LDAP server), the user name and the card information can be also registered in the IC card authenticating table 5.

Subsequently, in step S1109, a registration result (registration OK) is transmitted to the multifunction apparatus 100.

If it is determined from the comparison result of step S1106 that the card information of the same card number as that of the card information received in step S1104 exists in the card information searched for in step S1105, a discrimination result of step S1107 is YES and the processing routine advances to step S1110.

In step S1110, if it is determined from the comparison result of step S1106 that the validity information is also the same with respect to the card information of the same card number, since the card information of the same IC card has already been registered, the IC card authenticating server 200 transmits a card information registration failure (registration NG) to the multifunction apparatus 100.

If it is determined that the card information is the card information of the same card number and the validity information differs, it is decided that the card information is updated. The updating process of the card information (updating of the validity information, updating of the card name) is executed in step S1111. The existing card information (of the same card number) is updated by the card information received in step S1104.

After that, an updating result of the card information and a registration result (registration OK) are transmitted to the multifunction apparatus 100 in step S1112.

Even when the card information is the card information of the same card number and the validity information differs, if a numerical value of the validity information of the card information received in step S1104 is smaller, since it is decided that the card is a card before the IC card is reissued, the card information is not updated but the registration NG is transmitted to the multifunction apparatus 100.

A case where although the validity information is information showing the reissuance, the card number coincides in spite of a fact that the card was reissued corresponds to a case where in the operation, for example, a staff number or the like has arbitrarily been stored in the card. In a case where the staff number is used in a manner similar to the card number and the operation is performed, although the card number of the IC card which was reissued due to a reason such as missing coincides with that of the IC card before the reissuance, the validity information does not coincide. Further, when the card is reissued, 1 is added to the numerical value showing the validity information and the IC card is reissued. Therefore, the card in which the numerical value showing the validity information is smaller is determined to be the IC card before the missing or the like. Thus, even if it is intended to register the card before the missing or the like, owing to the above processes, since the numerical value of the validity information is small, the card information is not registered. Consequently, an abuse of the lost IC card or the like is prevented and the security can be held.

In step S1114, the multifunction apparatus 100 receives the registration results transmitted in steps S1109, S1112, and S1113.

In step S1115, the multifunction apparatus 100 discriminates the registration results received in step S1114.

When the card information registration failure (registration NG) is received, the processing routine advances to step S1116. In step S1116, the multifunction apparatus 100 displays a card information registration failure display screen (not shown).

When the card information registration success (registration OK) is received, the processing routine advances to step S1117.

In step S1117, the multifunction apparatus 100 discriminates whether or not the card information updating result has been received in step S1114.

If the card information has been updated, a card information updating success display screen is displayed (step S1119).

If the card information is not updated, since this means that the new card information has successfully been registered, a card information registration success display screen is displayed (step S1118).

Subsequently, processes when the card information deletion has been selected in step S903 in the authentication information management system 1 of the embodiment will be described with reference to FIG. 14.

Figure 14:
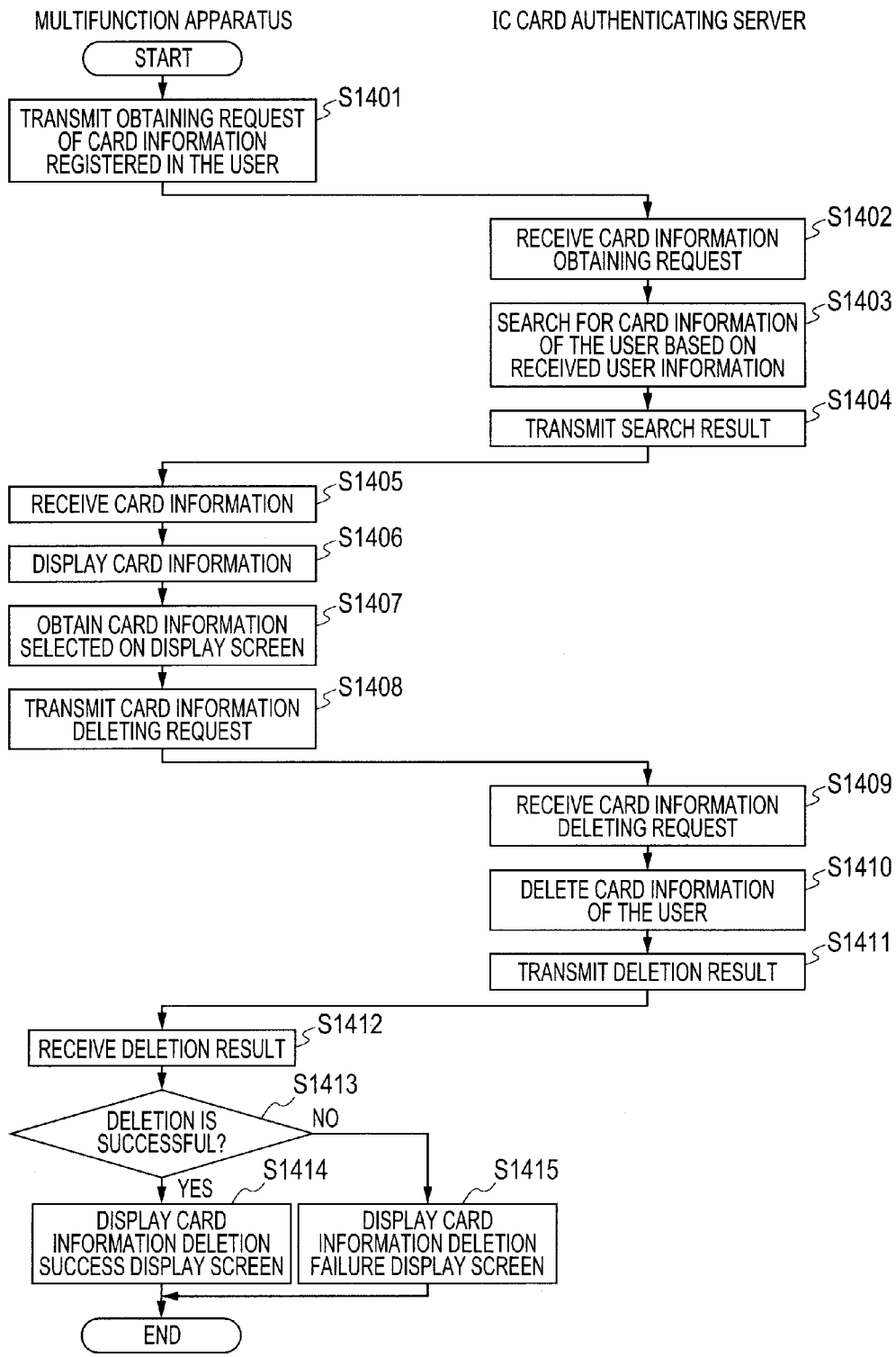
FIG. 14 is a flowchart illustrating an example of a control procedure at the time of deletion of the card information in the authentication information management system 1 of the invention.

FIG. 14 is a flowchart illustrating an example of a control procedure at the time of the deletion of the card information in the authentication information management system 1 of the invention.

When the card information deletion is selected in step S903 mentioned above, the multifunction apparatus 100 transmits an obtaining request of the card information held by the user to the IC card authenticating server 200 in step S1401. At this time, the user information (user name, user authentication destination) obtained in step S601 is transmitted.

Figure 15:
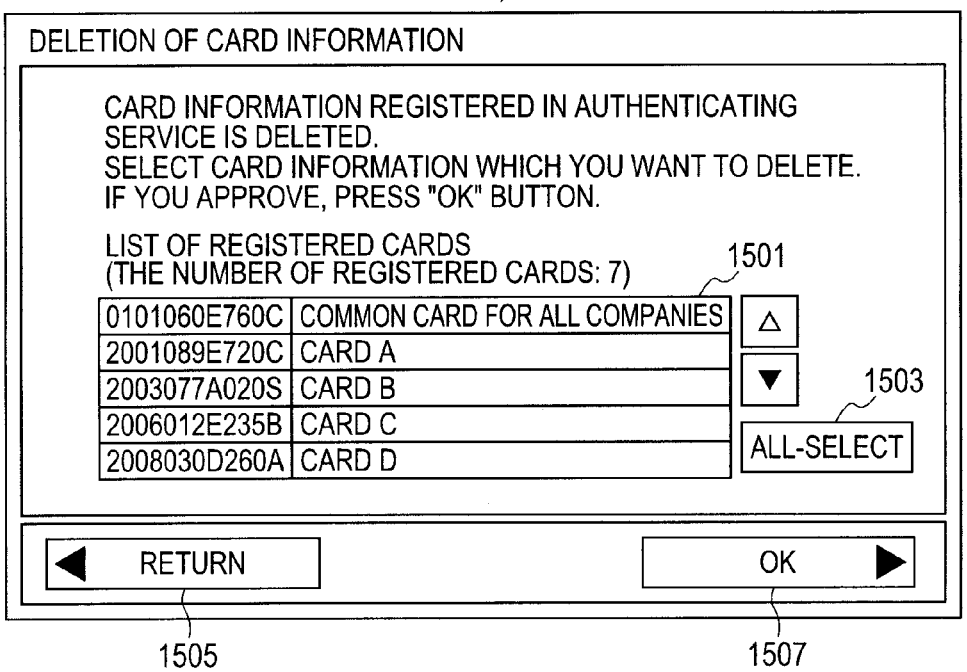
FIG. 15 is a diagram illustrating a card information deletion display screen 1500 in the authentication information management system 1 of the invention.

Although the invention has been constructed in such a manner that the display screen of FIG. 15 is displayed and the selected card information is deleted as will be described hereinafter, it is also possible to construct in such a manner that after the button of the card information deletion button 1003 in FIG. 10 was pressed, the IC card is held over the card reader 319, the card number obtained from the card reader 319 is transmitted to the IC card authenticating server 200, and the card information (card number, card name, and the like) is deleted in the IC card authenticating server 200.

Since there is a case of performing such an operation that one user possesses a personal IC card and a common IC card in the department, it is also possible to construct in such a manner that in order to delete the card information (card number, card name, and the like) of the specific user, the user information obtained in step S601 is transmitted to the IC card authenticating server 200.

In the case of such a construction that after the button of the card information deletion button 1003 in FIG. 10 was pressed, the IC card is held over the card reader 319, the card number obtained from the card reader 319 is transmitted to the IC card authenticating server 200, and the card information (card number, card name, and the like) is deleted in the IC card authenticating server 200 as mentioned above, it is also possible to construct in such a manner that the display screen of FIG. 15 is not displayed but a notification showing that the card which is deleted is held over the card reader is made (notification display screen is displayed).

Further, it is also possible to construct in such a manner that the display screen of FIG. 15 is displayed, when the card is held over the card reader, the card information which coincides with the card number of the IC card is automatically selected in 1501 in FIG. 15, and when an OK button 1507 is pressed, a deleting instruction is issued to the IC card authenticating server 200.

Thus, such a troublesomeness that the user selects the card information on the display screen of FIG. 15, which will be described hereinafter, is eliminated and the card information can be deleted.

For example, in the case where even if a list is displayed in 1501 in FIG. 15, when the user cannot determine to which card the card to be deleted corresponds (in the case where he forgot the card), by holding the IC card over the card reader without selecting the card information, he can delete the card information, so that it is particularly effective.

The IC card authenticating server 200 receives the obtaining request of the card information in step S1402.

Thus, the IC card authenticating server 200 searches for the card information associated with the received user information (user name, user authentication destination) in step S1403.

In step S1404, the IC card authenticating server 200 transmits the card information searched for in step S1403 to the multifunction apparatus 100.

The card number, validity information, and card name are included in the card information.

The multifunction apparatus 100 receives the card information in step S1405 and displays a list of the received card information in step S1406.

FIG. 15 is a diagram illustrating a card information deletion display screen 1500 in the authentication information management system 1 of the invention. The multifunction apparatus 100 displays the screen 1500 in step S1406.

The card information deletion display screen 1500 has: a card information list display unit 1501 for displaying the list of the card information associated with the user information so that they can be selected; an all-select button 1503 for instructing that all of the displayed card information are selected; a return button 1505 for displaying a previous display screen; and the OK button 1507 for deciding the selected card information.

A message for allowing the card information which is deleted to be selected and deleted from the displayed card information list is displayed. For example, a message "Card information registered in authenticating service is deleted. Select card information which you want to delete. If you approve, press "OK" button." is displayed.

Although the invention has been constructed in such a manner that as illustrated in FIG. 15, the list of the card information associated with the user information is displayed to the card information list display unit 1501 of the card information deletion display screen 1500 so that they can be selected, and the deletion of the selected card information is instructed by pressing the OK button 1507, the invention is not limited to such a construction. For example, is also possible to construct in such a manner that when the list of the card information associated with the user information is displayed to the card information list display unit 1501, it is displayed so that they cannot be selected (the list of the card information is merely displayed). In this case, when the OK button 1507 is pressed, the deletion is instructed to the IC card authenticating server 200 so as to delete all of the card information.

Although it is constructed in such a manner that the card information of the card name and the card number is displayed to the card information list display unit 1501, either the card name or the card number may be displayed.

Figure 16:
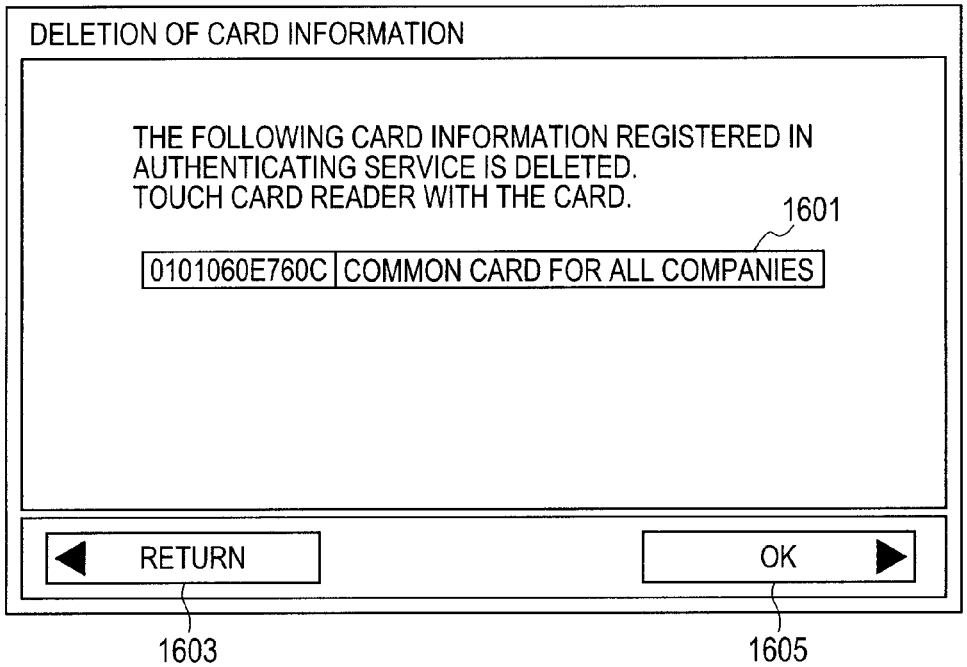
FIG. 16 is a diagram illustrating a card information reading display screen 1600 at the time of the deletion of the card information in the authentication information management system 1 of the invention.

In step S1407, when the selection of the card information which is deleted from the card information list is executed by the user operation, the multifunction apparatus 100 displays a card information reading display screen 1600 at the time of the card information deletion illustrated in FIG. 16.

FIG. 16 is a diagram illustrating the card information reading display screen 1600 at the time of the deletion of the card information in the authentication information management system 1 of the invention. The multifunction apparatus 100 displays the screen 1600 in step S1407.

The card information reading display screen 1600 has: a card information display unit 1601 for displaying the card information whose deletion has been selected in step S1407; a return button 1603 for displaying a previous display screen; and the OK button 1605 for deciding the card information which is deleted and transmitting to the IC card authenticating server 200.

A message for allowing the IC card corresponding to the displayed card information to be held over the card reader 319 and allowing the card information to be deleted is displayed. For example, a message "The following card information registered in authenticating service is deleted. Touch card reader with the card." is displayed.

When the IC card is held over the card reader by the user operation, the multifunction apparatus 100 compares the selected card information and the read card information. If the card number is the same, the card information is regarded as card information of a deletion target.

The operation to select the displayed card information list and hold the card over the card reader can be executed with respect to one or a plurality of card information.

Although the embodiment has been constructed in such a manner that after the card information to be deleted was selected on the card information deletion display screen 1500, the IC card is held over the card reader, and the card information in which the card number coincides is deleted, it is also possible to construct in such a manner that the card information is not selected but merely by holding the IC card over the card reader, the card information is deleted. In this case, by transmitting the card information of the IC card read by the card reader 319 to the IC card authenticating server 200, the card information can be deleted.

Further, it is also possible to construct in such a manner that the IC card is not held over the card reader but merely by selecting the card information, the card information is deleted. In this case, the selected card information is transmitted to the IC card authenticating server 200.

When the card information deletion is executed by the user operation (when the OK button 1605 is pressed in FIG. 16), in step S1408, the multifunction apparatus 100 transmits the card information (card number, validity information, card name) designated as a deletion target in step S1407 and the user information (user name, user authentication destination) as a card information deleting request to the IC card authenticating server 200.

The IC card authenticating server 200 receives the card information deleting request in step S1409.

Subsequently, in step S1410, the IC card authenticating server 200 deletes the card information as a deletion target in the card information corresponding to the user names included in the card information deleting request from the IC card authenticating table 5.

In step S1411, the IC card authenticating server 200 transmits a card information deletion result (deletion success, deletion failure) to the multifunction apparatus 100.

In step S1412, the multifunction apparatus 100 receives the card information deletion result.

Subsequently, in step S1413, the multifunction apparatus 100 discriminates the card information deletion result. If the deletion is successful, a card information deletion success display screen (not shown) is displayed (step S1414).

If the deletion failed due to a system obstruction or the like, a card information deletion failure display screen (not shown) is displayed (step S1415).

Subsequently, processes in the case where a password change display screen is displayed in step S906 in the authentication information management system 1 of the embodiment will be described with reference to FIG. 17.

Figure 17:
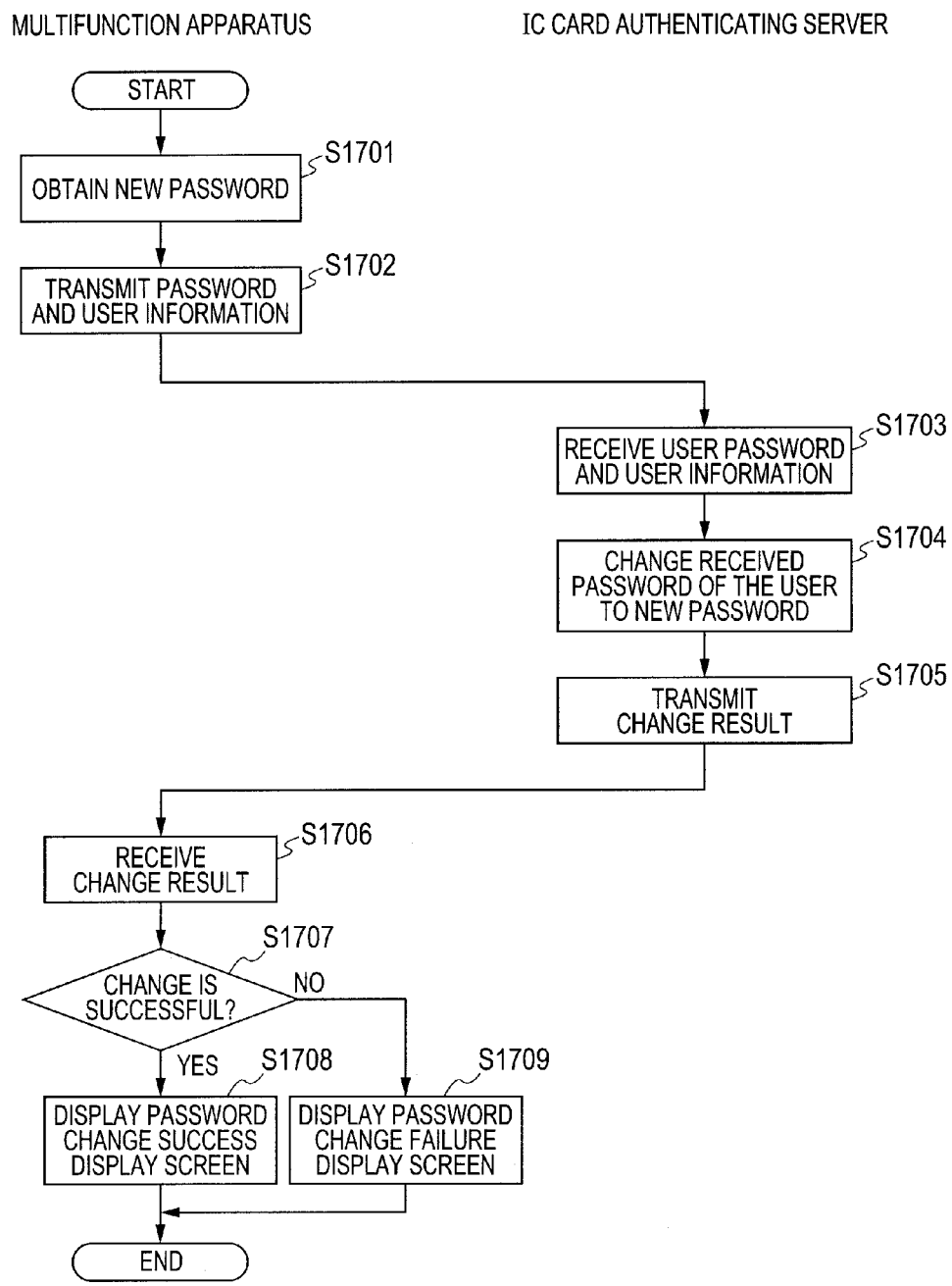
FIG. 17 is a flowchart illustrating an example of a control procedure at the time of a password change in the authentication information management system 1 of the invention.

FIG. 17 is a flowchart illustrating an example of a control procedure at the time of the password change in the authentication information management system 1 of the invention.

Figure 18:
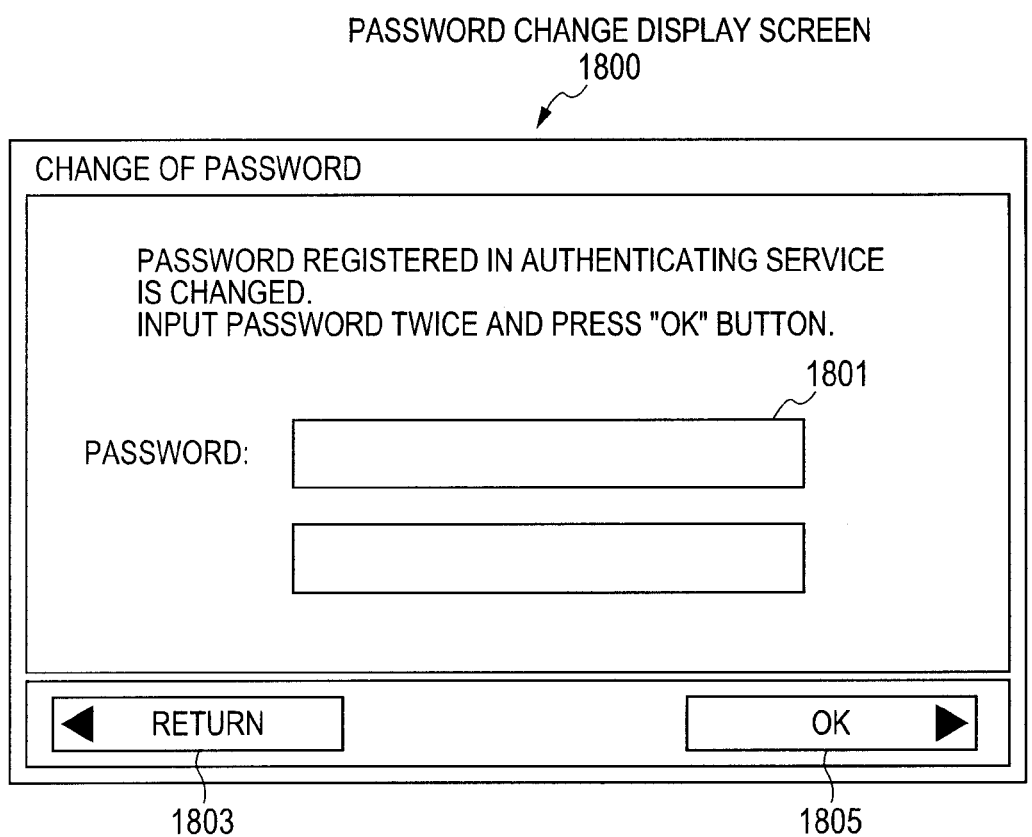
FIG. 18 is a diagram illustrating a password change display screen 1800 in the authentication information management system 1 of the invention.

When the password change is selected in step S905 mentioned above, the password change display screen illustrated in FIG. 18 is displayed in step S906.

FIG. 18 is the diagram illustrating a password change display screen 1800 in the authentication information management system 1 of the invention.

The password change display screen 1800 has: a password input unit 1801 for inputting a password; a return button 1803 for returning to a previous display screen; and an OK button 1805 for deciding the input contents and transmitting to the IC card authenticating server 200. Two input columns are provided for the password input unit 1801 and the input password can be confirmed.

A message for allowing the password to be changed is displayed. For example, a message "Password registered in authenticating service is changed. Input password twice and press "OK" button." is displayed.

In step S1701, the multifunction apparatus 100 obtains a new password which was input by the user operation through the password change display screen 1800.

Subsequently, in step S1702, the multifunction apparatus 100 transmits the new password obtained in step S1701 and the user information (user name, user authentication destination) obtained in step S601 to the IC card authenticating server 200.

In step S1703, the IC card authenticating server 200 receives the new password and the user information (user name, user authentication destination) transmitted in step S1702.

In step S1704, the IC card authenticating server 200 changes the password of the relevant user in the IC card authenticating table 5 to the new password.

In step S1705, the IC card authenticating server 200 transmits a password change result (change success, change failure) to the multifunction apparatus 100.

The multifunction apparatus 100 receives the password change result in step S1706.

The multifunction apparatus 100 discriminates the password change result in step S1707.

If the password change result indicates the change success, a password change success display screen is displayed (step S1708).

If the password change failed due to a system obstruction or the like and the password change result indicates the change failure, a password change failure display screen is displayed (step S1709).

Subsequently, processes when a lost card information deletion display screen is displayed in step S908 in the authentication information management system 1 of the embodiment will be described with reference to FIG. 20.

FIG. 20 is a flowchart illustrating an example of a control procedure at the time of the deletion of the lost card information in the authentication information management system 1 of the invention.

In step S907, if the lost card information deletion is selected, the operating mode is set to a lost card information deleting mode (lost storage medium deleting mode). In step S908, the lost card information deletion display screen illustrated in FIG. 19 is displayed.

Figure 19:
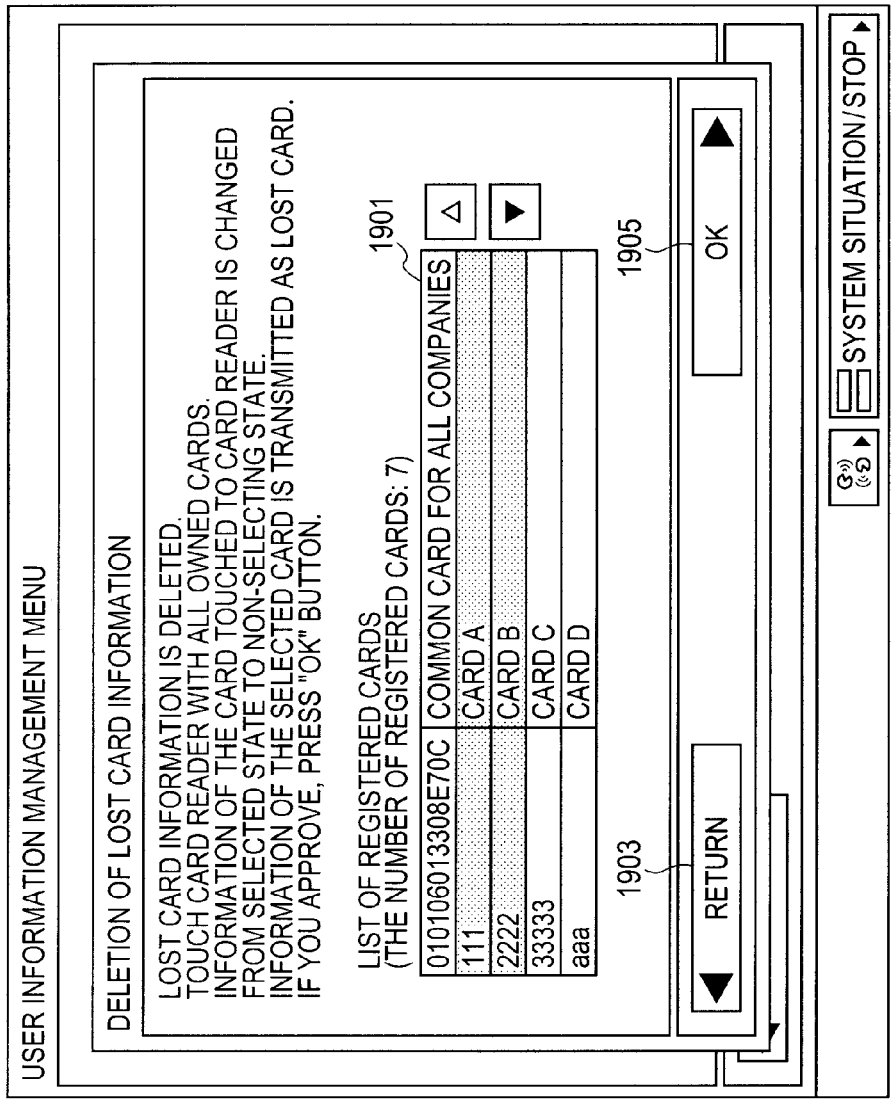
FIG. 19 is a diagram illustrating a lost card information deletion display screen 1900 in the authentication information management system 1 of the invention.

FIG. 19 is a diagram illustrating a lost card information deletion display screen 1900 in the authentication information management system 1 of the invention.

The lost card information deletion display screen 1900 has: a card information display unit 1901 for displaying the card information owned by the user; a return button 1903 for returning to a previous display screen; and an OK button 1905 for deciding the lost card information and transmitting to the IC card authenticating server 200. The card information owned by the user is displayed to the card information display unit 1901 in a state where all of them have been selected.

A message for allowing the lost card information to be decided is displayed. For example, a message "Lost card information is deleted. Touch card reader with all owned cards. Information of the card touched to card reader is changed from selected state to non-selecting state. Information of the selected card is transmitted as lost card. If you approve, press "OK" button." is displayed.

In step S2101, the multifunction apparatus 100 transmits a card information obtaining request including the user information (user name, user authentication destination) obtained in step S601 to the IC card authenticating server 200.

In step S2102, the IC card authenticating server 200 receives the card information obtaining request.

Thus, in step S2103, the IC card authenticating server 200 searches for the card information associated with the received user information (user name, user authentication destination).

In step S2104, the IC card authenticating server 200 transmits the card information searched for in step S2103 to the multifunction apparatus 100 (authentication information transmission). The card number, validity information, and card name are included in the card information.

The multifunction apparatus 100 receives the card information (authentication information reception) in step S2105 and displays a list of the received card information in an all-selecting state in step S2106 (authentication information list display).

In step S2107, the card number of the card held over the card reader by the user operation is obtained and it is discriminated whether or not there is card information in which the obtained card number and the card numbers of the card information displayed as a list coincide (first authentication information decision). If the card information in which the card number coincides exists, the coincident card information is changed to the non-selecting state on the list and displayed. Thus, the coincident card information and the dissident card information are displayed so that they can be distinguished.

When the lost card information deletion is executed by the user operation (when the OK button 1905 is pressed in FIG. 19), in step S2108, the multifunction apparatus 100 transmits the card information (card number, validity information, card name) in the selecting state on the displayed list designated as a deletion target in step S2107 and the user information (user name, user authentication destination) as a lost card information deleting request to the IC card authenticating server 200 (deleting request transmission).

The IC card authenticating server 200 receives the lost card information deleting request in step S2109 (deleting request reception).

Subsequently, in step S2110, the IC card authenticating server 200 deletes the card information which coincides with the card information corresponding to the user name included in the lost card information deleting request from the IC card authenticating table 5. At this time, the deleted card information is output to a log. The administrator can also perform the management and confirmation of the lost card information from the log.

In step S2111, the IC card authenticating server 200 transmits a card information deletion result (deletion success, deleted card information, deletion failure) to the multifunction apparatus 100.

The multifunction apparatus 100 receives the card information deletion result in step S2112.

Subsequently, the multifunction apparatus 100 discriminates the card information deletion result in step S2113. If the deletion is successful, the multifunction apparatus 100 outputs a report of missing describing the deleted card information in step S2114 (output unit). After that, the card information deletion success display screen (not shown) is displayed in step S2115.

If the deletion failed due to a system obstruction or the like, the card information deletion failure display screen (not shown) is displayed (step S2116).

As for the report of missing in step S2114, a form (not shown) of the report of missing has previously been stored in the external storage device 304 of the multifunction apparatus 100. The card number included in the card information deletion result and the user name (name of the user who has deleted the card) which was logged in the multifunction apparatus 100 are input to the form, thereby forming data of the report of missing. The data of the report of missing is converted into image data by the image processing unit 317 and printed by the printer unit 312. An area for writing a reason of the missing and the like are provided in the form of the report of missing.

Although the embodiment has been constructed in such a manner that the form of the report of missing is held in the multifunction apparatus 100 and the report of missing is printed, the form of the report of missing may be held in the IC card authenticating server 200 and the data of the report of missing may be formed in the IC card authenticating server 200. In this case, the data of the report of missing is transmitted to the deletion-requested multifunction apparatus 100 through a printer driver stored in the IC card authenticating server 200.

According to the embodiment of the invention, by reading the IC card (storage medium) owned by the user, the deletion of a plurality of IC cards (storage media) registered for one user can be easily performed from the multifunction apparatus (image forming apparatus).

Since the IC card information can be deleted and the report of missing for applying for the missing of the IC card can be output from the multifunction apparatus 100, an application at the time of missing can be easily performed. Particularly, in such a case where the user forgot the card number of the IC card because of the missing of the IC card, which one of the IC cards was lost can be easily decided and the administrator can easily make a management of the IC cards.

Since the card number of the lost IC card can be easily decided and can be stored as an IC card which cannot be used, such a situation that other users illegally use the lost IC card can be prevented.

Subsequently, processes when a card stocktaking display screen is displayed in step S910 in the authentication information management system 1 of the embodiment will be described with reference to FIG. 22.

FIG. 22 is a flowchart illustrating an example of a control procedure at the time of the card stocktaking in the authentication information management system 1 of the invention.

When the card stocktaking is selected in step S909 mentioned above, the operating mode is set to the card stocktaking mode (storage medium stocktaking mode). In step S910, the card stocktaking display screen illustrated in FIG. 21 is displayed.

Figure 21:
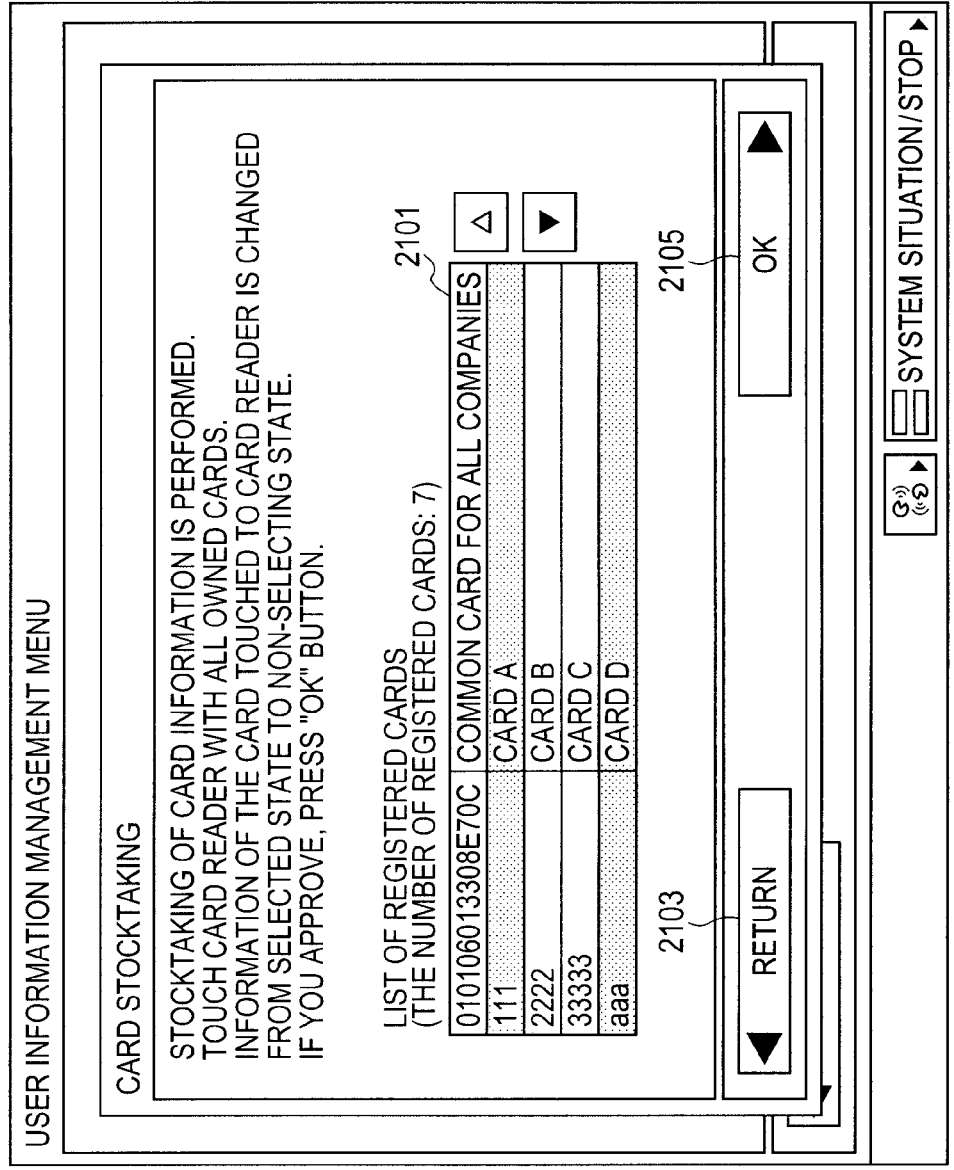
FIG. 21 is a diagram illustrating a card stocktaking display screen 2100 in the authentication information management system 1 of the invention.

FIG. 21 is a diagram illustrating a card stocktaking display screen 2100 in the authentication information management system 1 of the invention.

The card stocktaking display screen 2100 has: a card information display unit 2101 for displaying the card information owned by the user; a return button 2103 for returning to a previous display screen; and an OK button 2105 for deciding the lost card information and transmitting to the IC card authenticating server 200. The card information owned by the user is displayed to the card information display unit 2101 in a state where all of them have been selected.

A message for deciding the card information whose stocktaking is performed is displayed. For example, a message "Stocktaking of card information is performed. Touch card reader with all owned cards. Information of the card touched to card reader is changed from selected state to non-selecting state. Non-selected card information is transmitted as information whose stocktaking is not performed yet. If you approve, press "OK" button" is displayed.

In step S2201, the multifunction apparatus 100 transmits the card information obtaining request including the user information (user name, user authentication destination) obtained in step S601 to the IC card authenticating server 200.

In step S2202, the IC card authenticating server 200 receives the obtaining request of the card information.

Thus, in step S2203, the IC card authenticating server 200 searches for the card information associated with the received user information (user name, user authentication destination).

In step S2204, the IC card authenticating server 200 transmits the card information searched for in step S2203 to the multifunction apparatus 100. The card number, validity information, and card name are included in the card information.

The multifunction apparatus 100 receives the card information in step S2205 and displays a list of the received card information in step S2206 (authentication information list display).

In step S2207, the card number of the card held over the card reader by the user operation is read out and whether or not there is card information in which the obtained card number and the card number of the card information displayed as a list coincide is discriminated (second authentication information decision). If the card information whose card number coincides exists, the coincident card information is changed to the non-selecting state on the list and displayed. Thus, the coincident card information and the dissident card information are displayed so that they can be distinguished.

When the card information stocktaking is executed by the user operation (when the OK button 2105 is pressed in FIG. 21), in step S2208, the multifunction apparatus 100 transmits the card information (card number, validity information, card name) in the selecting state on the list designated as a stocktaking target in step S2207 and the user information (user name, user authentication destination) as a card information stocktaking request to the IC card authenticating server 200 (stocktaking request transmission).

In step S2209, the IC card authenticating server 200 receives the card information stocktaking request.

Subsequently, in step S2210, the IC card authenticating server 200 sets the stocktaking execution flag of the card information designated as a stocktaking target of the user name included in the card information stocktaking request to ON.

In step S2226, the IC card authenticating server 200 confirms the card stocktaking execution flag of the card information corresponding to the user name included in the card information stocktaking request. When the card stocktaking execution flags of all of the card information are ON, it is regarded that the stocktaking has been completed. If one or more card information in which the card stocktaking execution flag is OFF exist, it is regarded that the stocktaking is not completed yet.

In step S2211, the IC card authenticating server 200 transmits the card information stocktaking result (card information in which the stocktaking has been completed or the stocktaking is not completed yet and the card stocktaking execution flag is OFF) to the multifunction apparatus 100.

In step S2212, the multifunction apparatus 100 receives the card information stocktaking result.

Subsequently, the multifunction apparatus 100 discriminates the card information stocktaking result in step S2213. If the stocktaking of all of the card information has been completed (the card information stocktaking result indicates completion of the stocktaking), a stocktaking completion display screen (not shown) is displayed in step S2214.

If the stocktaking of all of the card information is not completed yet (the card information in which the card information stocktaking result indicates non-completion of the stocktaking and the card stocktaking execution flag is OFF), a confirmation display screen of the card information deletion (FIG. 19) is displayed. In step S2215, the card information included in the card stocktaking result received in step S2212 is displayed to the card information display unit 1901 of the confirmation display screen of the card information deletion.

Subsequently, in step S2216, the multifunction apparatus discriminates the user operation of step S2215. If the card information deletion is executed by the user operation (when the OK button 1905 is pressed in FIG. 19), in step S2217, the multifunction apparatus 100 transmits the card information (card number, validity information, card name) designated as a deletion target in step S2216 and the user information (user name, user authentication destination) as a lost card information deleting request to the IC card authenticating server 200.

In other words, the card information included in the lost card information deleting request is card information whose stocktaking is not requested in step S2208.

The IC card authenticating server 200 receives the lost card information deleting request in step S2218.

Subsequently, in step S2219, the IC card authenticating server 200 deletes the card information which coincides with the card information corresponding to the user name included in the card information deleting request from the IC card authenticating table 5. At this time, the deleted card information is output to the log. The administrator can also perform the management and confirmation of the lost card information from the log.

In step S2220, the IC card authenticating server 200 transmits the card information deletion result (deletion success and deleted card information, or deletion failure) to the multifunction apparatus 100.

The multifunction apparatus 100 receives the card information deletion result in step S2221.

Subsequently, the multifunction apparatus 100 discriminates the card information deletion result in step S2222. If the deletion is successful, the multifunction apparatus 100 outputs a report of missing describing the deleted card information in step S2223 (output unit). After that, the card information deletion success display screen (not shown) is displayed in step S2224.

If the deletion failed due to a system obstruction or the like, the card information deletion failure display screen (not shown) is displayed (step S2225).

As for the report of missing in step S2223, a form (not shown) of the report of missing has previously been stored in the external storage device 304 of the multifunction apparatus 100. The card number included in the card information deletion result and the user name (name of the user who has deleted the card) which was logged in the multifunction apparatus 100 are input to the form, thereby forming data of the report of missing. The data of the report of missing is converted into image data by the image processing unit 317 and printed by the printer unit 312.

Although the embodiment has been constructed in such a manner that the form of the report of missing is held in the multifunction apparatus 100 and the report of missing is printed, the form of the report of missing may be held in the IC card authenticating server 200 and the data of the report of missing may be formed in the IC card authenticating server 200. In this case, the data of the report of missing is transmitted to the deletion-requested multifunction apparatus 100 through the printer driver stored in the IC card authenticating server 200.

Subsequently, the stocktaking notifying process of the IC card authenticating server 200 and the process for confirming the card information whose stocktaking is not executed yet will be described with reference to FIG. 23.

The above processes are processes which are periodically executed on a background.

In step S2301, the IC card authenticating server 200 confirms the stocktaking execution timing from the setting information and discriminates whether or not the present date/time is timing when the stocktaking execution time has elapsed.

In step S2302, if the stocktaking execution time has elapsed, the card stocktaking execution flags of all of the card information registered in a database of the IC card authenticating server 200 are set to OFF.

In step S2303, the stocktaking execution timing as setting information of the IC card authenticating server 200 is set to the next date/time.

In step S2304, the stocktaking execution flag is confirmed and a stocktaking notification is sent by E-mail to the user having the card information in which the stocktaking execution flag is OFF.

As described above, according to the embodiment of the invention, by reading the IC card (storage medium) owned by the user, the deletion of a plurality of IC cards (storage media) registered for one user can be easily performed from the multifunction apparatus (image forming apparatus).

The stocktaking of a plurality of IC cards (storage media) registered for one user can be easily performed from the multifunction apparatus (image forming apparatus).

Since the IC card information can be deleted at the time of the card stocktaking and the report of missing for applying for the missing of the IC card can be output from the multifunction apparatus 100, an application at the time of missing can be easily performed. Particularly, in such a case where the user forgot the card number of the IC card because of the missing of the IC card, which one of the IC cards was lost can be easily decided and the administrator can easily make a management of the IC cards.

Since the card number of the lost IC card can be easily decided and can be stored as an IC card which cannot be used, such a situation that other users illegally use the lost IC card can be prevented.

The constructions and contents of the various kinds of data are not limited to those mentioned above but, naturally, they may be formed by various kinds of constructions and contents according to applications and objects.

Although the embodiment has been shown and described above, the invention can be applied to an embodiment as, for example, a system, an apparatus, a method, a program, a recording medium, or the like. Specifically speaking, the invention can be also applied to a system constructed by a plurality of apparatuses or may be applied to an apparatus constructed by one device.

The program in the invention is a program for enabling a computer (CPU or hardware circuit) to execute (read) the processing methods of FIGS. 6, 8, 9, 11, 14, 17, 20, 22, and 23. The program for enabling the computer to execute the processing methods of FIGS. 6, 8, 9, 11, 14, 17, 20, 22, and 23 has been stored in the storage medium of the invention. The program in the invention may be a program in each processing method of each apparatus of FIGS. 6, 8, 9, 11, 14, 17, 20, 22, and 23.

As described above, according to the embodiment, a mechanism for reducing a burden of managing the IC cards can be provided.

According to the embodiment, such a mechanism that by reading the IC card (an example of the storage medium) owned by the user, the deletion of a plurality of IC cards (storage media) registered for one user can be easily performed from the image forming apparatus can be provided.

Further, such a mechanism that the stocktaking of a plurality of IC cards (an example of the storage media) registered for one user can be easily performed from the image forming apparatus can be provided.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-125773, filed May 25, 2009, which is hereby incorporated by reference herein in its entirety.

What is claimed is:

1. An image forming apparatus which can communicate, through a communication medium, with an authenticating server having a storing unit in which user information for identifying a user and first authentication information included in a plurality of storage media have been stored in correspondence to each other, comprising:
    a computer configured to implement:
        an authentication information receiving unit configured to receive, from the authenticating server, first authentication information which was made to correspond to user information input to the image forming apparatus;
        a first authentication information specifying unit configured to specify the first authentication information which does not coincide with second authentication information which is obtained by reading a storage medium that is owned by the user and is used for user authentication and which is included in the storage medium;
        a deleting request transmitting unit configured to transmit a deleting request including the first authentication information specified by the first authentication information specifying unit to the authenticating server;
        a second authentication information specifying unit configured to specify the first authentication information which coincides with the second authentication information which is obtained by reading the storage medium that is owned by the user and is used for the user authentication and which is included in the storage medium; and
        a stocktaking request transmitting unit configured to transmit a stocktaking request including the first authentication information specified by the second authentication information specifying unit to the authenticating server,
    wherein the first authentication information included in the deleting request is the first authentication information whose stocktaking is not performed by the stocktaking request.

2. An apparatus according to claim 1, wherein the computer is further configured to implement:
    an authentication information list display unit configured to display a list of the first authentication information obtained by the authentication information obtaining unit, wherein the authentication information list display unit displays the first authentication information which does not coincide with the second authentication information and the first authentication information which coincides with the second authentication information so that they can be distinguished.

3. An apparatus according to claim 2, wherein the computer is further configured to implement:
a lost storage medium deleting mode for enabling the lost storage medium to be deleted by reading the storage medium that is owned by the user and is used for the user authentication; and
a storage medium stocktaking mode for enabling the stocktaking of the storage medium owned by the user to be performed by reading the storage medium that is owned by the user and is used for the user authentication,
wherein, in the lost storage medium deleting mode, the first authentication information which does not coincide with the second authentication information is set to a selecting state by the authentication information list display unit and the first authentication information which coincides with the second authentication information is set to a non-selecting state by the authentication information list display unit, and
wherein, in the storage medium stocktaking mode, the first authentication information which does not coincide with the second authentication information is set to the non-selecting state by the authentication information list display unit and the first authentication information which coincides with the second authentication information is set to the selecting state by the authentication information list display unit.

4. An apparatus according to claim 3, wherein, in the lost storage medium deleting mode, the first authentication information included in the deleting request is the first authentication information which does not coincide with the second authentication information, and, in the storage medium stocktaking mode, the first authentication information included in the deleting request is the first authentication information which coincides with the second authentication information.

5. An apparatus according to claim 1, wherein the computer is further configured to implement an output unit configured to transmit the deleting request by the deleting request transmitting unit and output print data including the first authentication information included in the deleting request.

6. A processing method performed by a computer of an image forming apparatus which can communicate, through a communication medium, with an authenticating server having a storing unit in which user information for identifying a user and first authentication information included in a plurality of storage media have been stored in correspondence to each other, the processing method comprising:
receiving, from the authenticating server, first authentication information which was made to correspond to user information input to the image forming apparatus;
specifying the first authentication information which does not coincide with second authentication information which is obtained by reading a storage medium that is owned by the user and is used for user authentication and which is included in the storage medium;
transmitting a deleting request including the specified first authentication information to the authenticating server;
specifying the first authentication information which coincides with the second authentication information which is obtained by reading the storage medium that is owned by the user and is used for the user authentication and which is included in the storage medium; and
transmitting a stocktaking request including the specified first authentication information which coincides with the second authentication information to the authenticating server,
wherein the first authentication information included in the deleting request is the first authentication information whose stocktaking is not performed by the stocktaking request.

7. A non-transitory computer-readable storage medium which stores a program that, when executed by a computer, causes an image forming apparatus, which can communicate, through a communication medium, with an authenticating server having a storing unit in which user information for identifying a user and first authentication information included in a plurality of storage media have been stored in correspondence to each other, to perform a processing method comprising:
receiving, from the authenticating server, first authentication information which was made to correspond to user information input to the image forming apparatus;
specifying the first authentication information which does not coincide with second authentication information which is obtained by reading a storage medium that is owned by the user and is used for user authentication and which is included in the storage medium;
transmitting a deleting request including the specified first authentication information to the authenticating server;
specifying the first authentication information which coincides with the second authentication information which is obtained by reading the storage medium that is owned by the user and is used for the user authentication and which is included in the storage medium; and
transmitting a stocktaking request including the specified first authentication information which coincides with the second authentication information to the authenticating server,
wherein the first authentication information included in the deleting request is the first authentication information whose stocktaking is not performed by the stocktaking request.

* * * * *